(12) United States Patent
Shapiro et al.

(10) Patent No.: US 11,797,652 B2
(45) Date of Patent: Oct. 24, 2023

(54) CLOUD CONTROLLED LASER FABRICATION

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US); Dean Putney, Seattle, WA (US); Timothy Ellis, Everett, WA (US); Lauren Banka, Seattle, WA (US)

(73) Assignee: Glowforge, Inc., Seattle, WA (US)

( * ) Notice: Subject to any disclaimer, the term of this patent is extended or adjusted under 35 U.S.C. 154(b) by 0 days.

(21) Appl. No.: 17/350,789

(22) Filed: Jun. 17, 2021

(65) Prior Publication Data
US 2021/0311451 A1 Oct. 7, 2021

Related U.S. Application Data

(63) Continuation of application No. 16/442,198, filed on Jun. 14, 2019, now Pat. No. 11,231,693, which is a
(Continued)

(51) Int. Cl.
*G06F 21/12* (2013.01)
*G05B 19/18* (2006.01)
(Continued)

(52) U.S. Cl.
CPC .......... *G06F 21/121* (2013.01); *B23K 10/006* (2013.01); *B23K 26/032* (2013.01);
(Continued)

(58) Field of Classification Search
CPC .. B23K 26/032; B23K 26/0876; B23K 26/38; B23K 26/703; B23K 37/006;
(Continued)

(56) References Cited

U.S. PATENT DOCUMENTS 3,721,811 A   3/1973  Taylor et al.
3,967,176 A   6/1976  Wagener et al.
(Continued)

FOREIGN PATENT DOCUMENTS

CN        1364033 A     8/2002
CN      101095033 A    12/2007
(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.
(Continued)

*Primary Examiner* — Crystal J Barnes-Bullock
(74) *Attorney, Agent, or Firm* — Lee Sullivan Shea & Smith LLP

(57) ABSTRACT

An execution plan segment of an execution plan can be received at a control unit of a computer numerically controlled machine from a general purpose computer. The execution plan segment can define operations for causing movement of a moveable head of the computer numerically controlled machine to deliver electromagnetic energy to effect a change in a material within an interior space of the computer numerically controlled machine. The execution plan segment can include a predefined safe pausing point from which the execution plan can be restarted while minimizing a difference in appearance of a finished workproduct relative to if a pause and restart are not necessary. Operations of the computer numerically controlled machine can be commenced only after determining that the execution plan segment has been received up to and including the predefined safe pausing point by the computer numerically controlled machine.

20 Claims, 18 Drawing Sheets

Related U.S. Application Data continuation of application No. 15/334,120, filed on Oct. 25, 2016, now Pat. No. 10,379,517, which is a continuation of application No. PCT/US2016/017904, filed on Feb. 12, 2016.

(60) Provisional application No. 62/222,756, filed on Sep. 23, 2015, provisional application No. 62/222,758, filed on Sep. 23, 2015, provisional application No. 62/222,757, filed on Sep. 23, 2015, provisional application No. 62/115,562, filed on Feb. 12, 2015, provisional application No. 62/115,571, filed on Feb. 12, 2015.

(51) Int. Cl.
| | |
|---|---|
| *B23K 10/00* | (2006.01) |
| *B23Q 17/22* | (2006.01) |
| *G05B 19/406* | (2006.01) |
| *B23K 37/02* | (2006.01) |
| *B23K 26/03* | (2006.01) |
| *B23K 26/08* | (2014.01) |
| *B23K 26/38* | (2014.01) |
| *B23K 37/04* | (2006.01) |
| *B23K 26/082* | (2014.01) |
| *G05B 19/402* | (2006.01) |
| *B33Y 50/00* | (2015.01) |

(52) U.S. Cl.
CPC ............ *B23K 26/08* (2013.01); *B23K 26/082* (2015.10); *B23K 26/0853* (2013.01); *B23K 26/0876* (2013.01); *B23K 26/38* (2013.01); *B23K 37/0211* (2013.01); *B23K 37/0235* (2013.01); *B23K 37/0408* (2013.01); *B23Q 17/22* (2013.01); *G05B 19/18* (2013.01); *G05B 19/402* (2013.01); *G05B 19/406* (2013.01); *B33Y 50/00* (2014.12); *G05B 2219/31186* (2013.01); *G05B 2219/32001* (2013.01); *G05B 2219/36053* (2013.01); *G05B 2219/36199* (2013.01); *G05B 2219/37359* (2013.01); *G05B 2219/37555* (2013.01); *G05B 2219/42307* (2013.01); *G05B 2219/45041* (2013.01); *G05B 2219/45212* (2013.01); *Y02P 80/40* (2015.11); *Y02P 90/80* (2015.11)

(58) Field of Classification Search
CPC ............ B23K 37/0235; B23K 37/0408; B23K 2101/18; G05B 19/406; G05B 19/409; G05B 19/4093; G05B 19/4097; G05B 19/4155; G05B 19/416; G05B 2219/35134; G05B 2219/35585; G05B 2219/36053; G05B 2219/36175; G05B 2219/45041; G05B 2219/43158; G05B 2219/43; G05B 2219/43168; G05B 2219/45165; G05B 2219/45212; G06F 21/10; G06F 21/12; G06F 21/121; G06F 21/125

See application file for complete search history.

(56) References Cited

U.S. PATENT DOCUMENTS

| | | |
|---|---|---|
| 4,055,787 A | 10/1977 | Beadle et al. |
| 4,138,718 A | 2/1979 | Toke et al. |
| 4,383,762 A | 5/1983 | Burkert |
| 4,518,843 A | 5/1985 | Antol et al. |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 5,136,160 A | 8/1992 | Nakane et al. |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,585,018 A | 12/1996 | Kanaoka et al. |
| 5,682,319 A | 10/1997 | Boland et al. |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,420,674 B1 | 7/2002 | Cole, III et al. |
| 6,420,675 B1 | 7/2002 | Lizotte et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,772,067 B2 | 9/2017 | Bunz et al. |
| 9,782,906 B1 | 10/2017 | Aminpour et al. |
| 9,908,290 B1 | 3/2018 | Clayton |
| 9,912,915 B2 | 3/2018 | Sinclair |
| 9,987,798 B2 | 6/2018 | Tyler |
| 10,234,260 B2 | 3/2019 | Siercks et al. |
| 10,340,654 B2 | 7/2019 | Nogiwa et al. |
| 10,379,517 B2 | 8/2019 | Shapiro et al. |
| 10,496,070 B2 | 12/2019 | Shapiro et al. |
| 10,509,390 B2 | 12/2019 | Shapiro et al. |
| 10,551,824 B2 | 2/2020 | Shapiro et al. |
| 10,642,251 B2 | 5/2020 | Platts et al. |
| 10,737,355 B2 | 8/2020 | Shapiro et al. |
| 10,802,465 B2 | 10/2020 | Shapiro et al. |
| 11,249,456 B2 * | 2/2022 | Shapiro ............ G05B 19/4097 |
| 11,281,189 B2 * | 3/2022 | Shapiro ............ G05B 19/409 |
| 11,327,461 B2 * | 5/2022 | Shapiro ............ B23K 37/0408 |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0029493 A1 | 2/2004 | Tricard et al. |
| 2004/0207831 A1 | 10/2004 | Aoyama |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1 | 3/2005 | Yamazaki et al. |
| 2005/0115941 A1 | 6/2005 | Sukhman et al. |
| 2005/0142701 A1 | 6/2005 | Yamaguchi et al. |
| 2005/0187651 A1 | 8/2005 | Kimura et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2007/0181544 A1 | 8/2007 | Sukhman et al. |
| 2008/0058734 A1 | 3/2008 | Hanft et al. |
| 2008/0100829 A1 | 5/2008 | Watson |
| 2008/0101687 A1 | 5/2008 | Goeller |
| 2008/0149604 A1 | 6/2008 | Varriano-Marston et al. |
| 2008/0160254 A1 | 7/2008 | Arnold |
| 2008/0243299 A1 | 10/2008 | Johnson et al. |
| 2008/0249653 A1 | 10/2008 | Ichikawa |
| 2009/0120914 A1 | 5/2009 | Lawrence |
| 2009/0250445 A1 | 10/2009 | Yamaguchi et al. |
| 2009/0308851 A1 | 12/2009 | Harnisch et al. |

(56) References Cited

U.S. PATENT DOCUMENTS

| | | |
|---|---|---|
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0274379 A1 | 10/2010 | Hehl |
| 2010/0292947 A1 | 11/2010 | Buk |
| 2010/0301023 A1 | 12/2010 | Unrath et al. |
| 2010/0326962 A1 | 12/2010 | Calla et al. |
| 2011/0005458 A1 | 1/2011 | Cunningham |
| 2011/0080476 A1 | 4/2011 | Dinauer et al. |
| 2011/0127333 A1 | 6/2011 | Veksland et al. |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 | 12/2011 | Pienaar |
| 2012/0026249 A1 | 2/2012 | Kihira et al. |
| 2012/0035745 A1 | 2/2012 | Mori et al. |
| 2012/0117787 A1 | 5/2012 | Sun et al. |
| 2012/0120232 A1 | 5/2012 | Nishikawa |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071502 A1 | 3/2014 | Liu |
| 2014/0160273 A1 | 6/2014 | Jedynak et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0327687 A1 | 11/2014 | Murakami |
| 2014/0330424 A1 | 11/2014 | Garaas et al. |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0136949 A1 | 5/2015 | De Nooij et al. |
| 2015/0154453 A1 | 6/2015 | Wilf |
| 2015/0158121 A1 | 6/2015 | Di Cairano et al. |
| 2015/0158311 A1 | 6/2015 | Ogasawara et al. |
| 2015/0197064 A1 | 7/2015 | Walker et al. |
| 2015/0212421 A1 | 7/2015 | deVilliers et al. |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0059371 A1 | 3/2016 | Chang et al. |
| 2016/0084649 A1 | 3/2016 | Yamazaki et al. |
| 2016/0093540 A1 | 3/2016 | Liu et al. |
| 2016/0147213 A1 | 5/2016 | Murakami |
| 2016/0156771 A1 | 6/2016 | Lee |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0349038 A1 | 12/2016 | Ohtsuka et al. |
| 2016/0360409 A1 | 12/2016 | Singh |
| 2016/0372349 A1 | 12/2016 | Hyakumura |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0057008 A1 | 3/2017 | Liu et al. |
| 2017/0123362 A1 | 5/2017 | Masui et al. |
| 2017/0129180 A1 | 5/2017 | Coates et al. |
| 2017/0203390 A1 | 7/2017 | Kato |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0150047 A1 | 5/2018 | Shapiro |
| 2019/0014307 A1 | 1/2019 | McNamer et al. |
| 2019/0058870 A1 | 2/2019 | Rowell et al. |
| 2019/0278250 A1 | 9/2019 | Clement et al. |
| 2019/0310604 A1 | 10/2019 | Shapiro et al. |
| 2020/0039002 A1 | 2/2020 | Sercel et al. |
| 2020/0064806 A1 | 2/2020 | Shapiro et al. |
| 2020/0073362 A1 | 3/2020 | Shapiro et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0192332 A1 | 6/2020 | Jacobs et al. |
| 2020/0398457 A1 | 12/2020 | Zhang et al. |
| 2021/0094127 A1 | 4/2021 | Sercel et al. |
| 2022/0066413 A1* | 3/2022 | Shapiro .............. G05B 19/406 |
| 2022/0276632 A1* | 9/2022 | Shapiro ................. G06V 10/40 |
| 2022/0350306 A1* | 11/2022 | Shapiro ............. G05B 19/4097 |

FOREIGN PATENT DOCUMENTS

| | | | | |
|---|---|---|---|---|
| CN | 101283362 A | | 10/2008 | |
| CN | 201253852 Y | | 6/2009 | |
| CN | 101559513 A | | 10/2009 | |
| CN | 101733558 A | | 6/2010 | |
| CN | 101837517 A | | 9/2010 | |
| CN | 205958834 U | | 2/2017 | |
| CN | 106670656 A | | 5/2017 | |
| DE | 10 2014 214058 A1 | | 1/2016 | |
| EP | 0 954 125 A2 | | 11/1999 | |
| EP | 1 309 108 A1 | | 5/2003 | |
| EP | 2 471 625 A2 | | 7/2012 | |
| EP | 2 808 123 A1 | | 12/2014 | |
| FR | 2748562 A1 | | 11/1997 | |
| JP | H03-254380 A | | 11/1991 | |
| JP | 04-244347 A | | 9/1992 | |
| JP | H05-205051 A | | 8/1993 | |
| JP | 2000503154 A | * | 3/2000 | ............ G06F 21/72 |
| JP | 2001-330413 A | | 11/2001 | |
| JP | 2002-123306 A | | 4/2002 | |
| JP | 2004517377 A | * | 6/2004 | ............ H04L 63/10 |
| JP | 2006-329751 A | | 12/2006 | |
| JP | 2008-119718 A | | 5/2008 | |
| JP | 4694077 B2 | * | 6/2011 | ............ G06F 21/10 |
| WO | WO-94/03302 A1 | | 2/1994 | |
| WO | WO-96/23240 A1 | | 8/1996 | |
| WO | WO-01/076250 A1 | | 10/2001 | |
| WO | WO-2016/131019 A1 | | 8/2016 | |
| WO | WO-2016/131022 A1 | | 8/2016 | |
| WO | WO-2016131021 A1 | * | 8/2016 | .......... B23K 26/032 |
| WO | WO-2018098394 A1 | * | 5/2018 | ......... G05B 19/4093 |
| WO | WO-2018098398 A1 | * | 5/2018 | .......... B23K 26/035 |

OTHER PUBLICATIONS

Examination Report issued in European Patent Application No. 16709185.9, dated Jul. 1, 2020 (Jul. 1, 2020). 5 pages.
First Office Action issued in Chinese Patent Application No. 201680021337.8, dated Apr. 10, 2019. 6 pages. [Chinese language].
First Office Action issued in Chinese Patent Application No. 201680021337.8, dated Apr. 10, 2019. 8 pages. [English language translation].
First Office Action issued in Chinese Patent Application No. 201780084613.X, dated Sep. 9, 2021. 11 pages. [Chinese language].
Gao, Rong et al. "Human-Machine Collaborative Workshop Digital Manufacturing." *ICICTA. 2010 IEEE*. May 11, 2010. pp. 445-448.
International Search Report and Written Opinion issued in International Application No. PCT/US2016/017900, dated May 27, 2016. 16 pages.

(56) References Cited

OTHER PUBLICATIONS

International Search Report and Written Opinion issued in International Application No. PCT/US2016/017901, dated Jun. 3, 2016 (Jun. 3, 2016). 13 pages.

International Search Report and Written Opinion issued in International Application No. PCT/US2016/017903, dated Jun. 1, 2016. 15 pages.

International Search Report and Written Opinion issued in International Application No. PCT/US2016/017904, dated May 23, 2016. (May 23, 2016). 19 pages.

International Search Report and Written Opinion issued in International Application No. PCT/US2017/063187, dated Apr. 3, 2018 (Apr. 3, 2018). 11 pages.

International Search Report and Written Opinion issued in International Application No. PCT/US2017/063188, dated Feb. 16, 2018 (Feb. 16, 2018). 14 pages.

International Search Report and Written Opinion issued in International Application No. PCT/US2017/063189, dated May 2, 2018 (May 2, 2018). 22 pages.

International Search Report and Written Opinion issued in International Application No. PCT/US2017/063190, dated May 3, 2018 (May 3, 2018). 18 pages.

International Search Report and Written Opinion issued in International Application No. PCT/US2017/063191, dated Mar. 21, 2018 (Mar. 21, 2018). 12 pages.

International Search Report and Written Opinion issued in International Application No. PCT/US2017/063192, dated Apr. 19, 2018 (Apr. 19, 2018). 12 pages.

International Search Report and Written Opinion issued in International Application No. PCT/US2017/063193, dated Feb. 16, 2018 (Feb. 16, 2018). 12 pages.

Second Office Action issued in Chinese Patent Application No. 201680021337.8, dated Nov. 4, 2019. 3 pages. [Chinese language].

Second Office Action issued in Chinese Patent Application No. 201680021337.8, dated Nov. 4, 2019. 4 pages. [English language translation].

Third Office Action issued in Chinese Patent Application No. 201680021337.8, dated Jul. 23, 2020. 11 pages. [Chinese language].

Third Office Action issued in Chinese Patent Application No. 201680021337.8, dated Jul. 23, 2020. 20 pages. [English language translation].

* cited by examiner

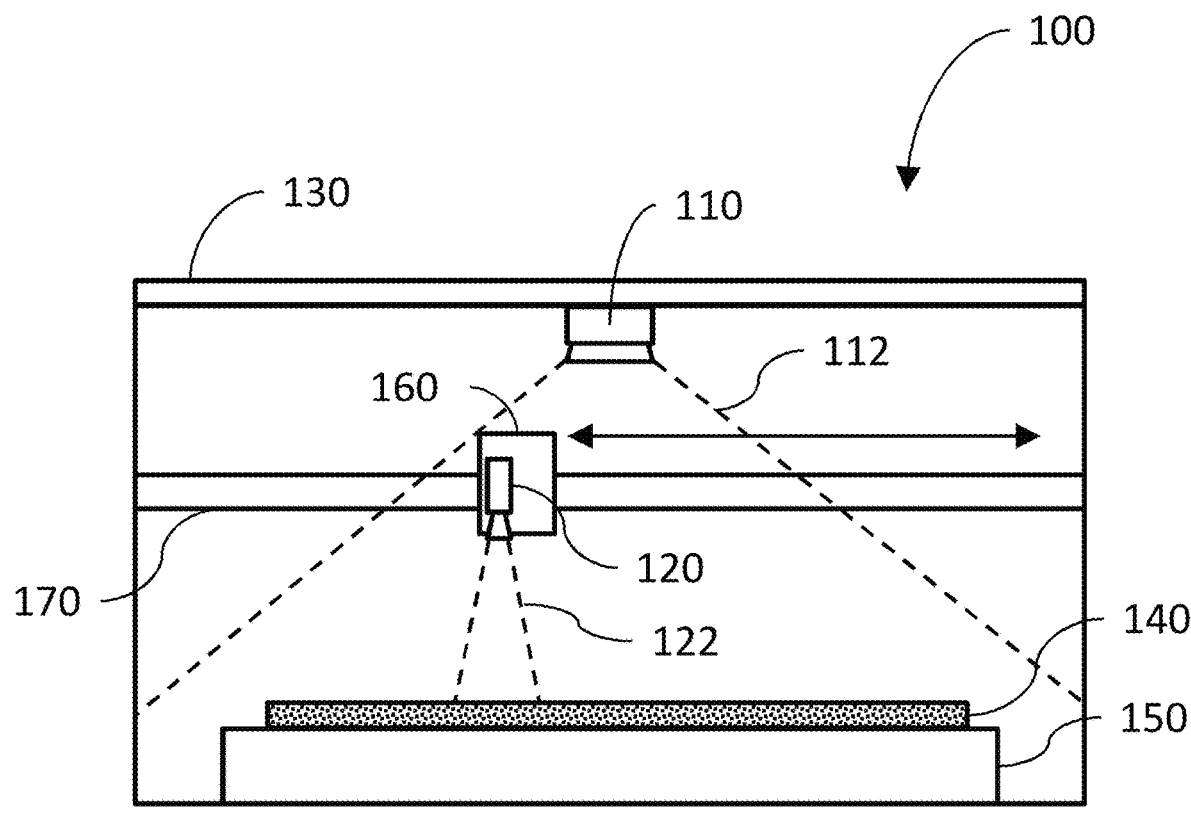
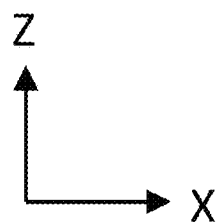
Fig. 1

310 — 
```
<svg width = "640" height = "480" xmlns=http://www.s3.org/2000/svg>
    <g>
        <rect x="100" y="100" fill="#000000" width="300" height="150" fill-opacity="0" stroke="000000"/>
    </g>
</svg>
```

Fig. 3A

320 — [drawing area with rectangle 330 showing "St-out point" marker, coordinates (0.0; 0.0; 0.0) at lower-left and (100.0; 0.0; -0.125) at lower-right]

Fig. 3B

340 —
```
%
(Header)
M3
(Header end.)
G21

(Start cutting path id: rect3336)
(Change tool to Default tool)

G00 Z5.000000
G00 X28.362631 Y70.415140

G01 Z-0.125000 F100.0(Penetrate)
G01 X112.748481 Y70.415140 Z-0.125000 F400.000000
G01 X112.748481 Y28.362624 Z-0.125000
G01 X28.362631 Y28.362624 Z-0.125000
G01 X28.362631 Y70.415140 Z-0.125000
G00 Z5.000000

(End cutting path id: rect3336)

(Footer)
M5
G00 X0.0000 Y0.0000
M2
(Using default footer. To add your own footer create file "footer" in the output dir.)
(end)
%
```

Fig. 3C

910 — receive at control unit of computer numerically controlled machine from general purpose computer that is not part of a computer numerically controlled machine, execution plan segment of execution plan created at general purpose computer, execution plan segment defining operations for causing movement of moveable head of the computer numerically controlled machine to deliver electromagnetic energy to effect change in material within interior space of the computer numerically controlled machine, execution plan segment further including predefined safe pausing point from which clean restart of operations of execution plan can be performed 920 — commencing operations of computer numerically controlled machine defined in execution plan segment only after determining that execution plan segment has been received up to and including predefined safe pausing point by the computer numerically controlled machine

Fig. 9

Project preview

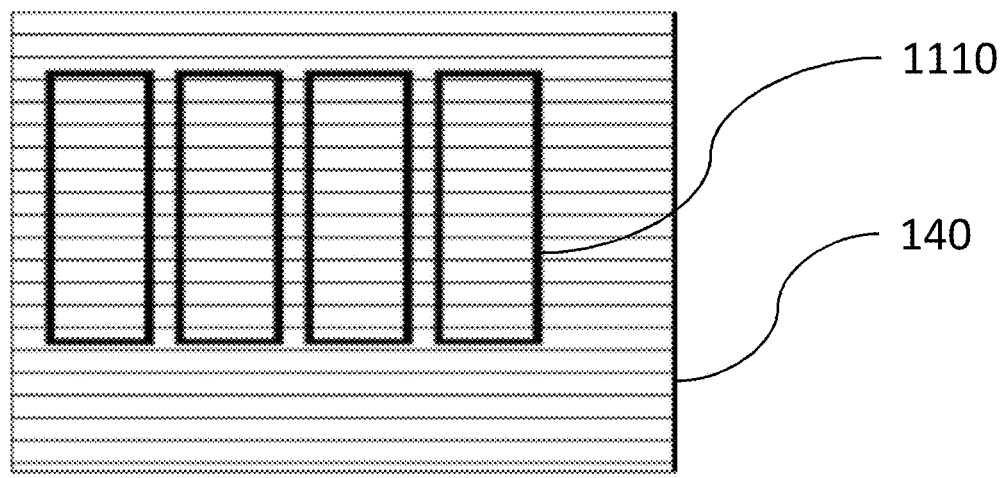
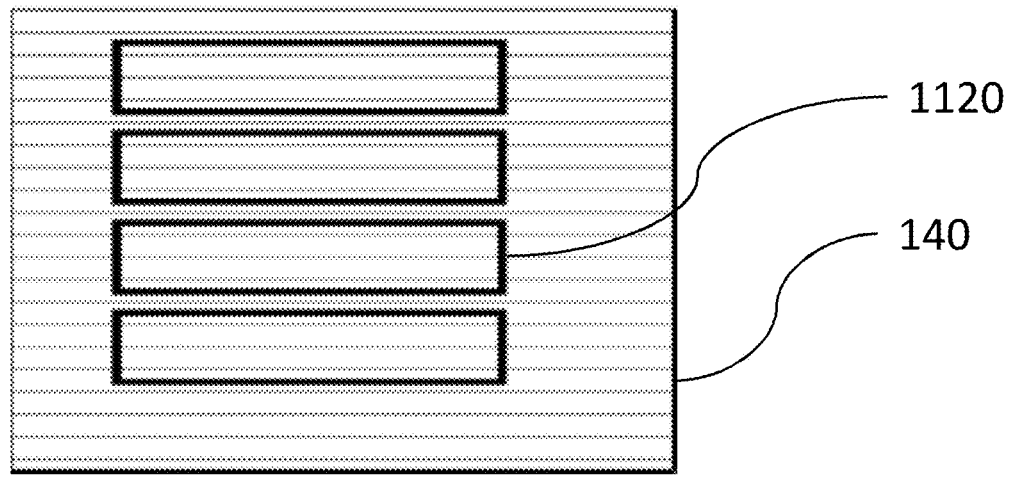
Fig. 11

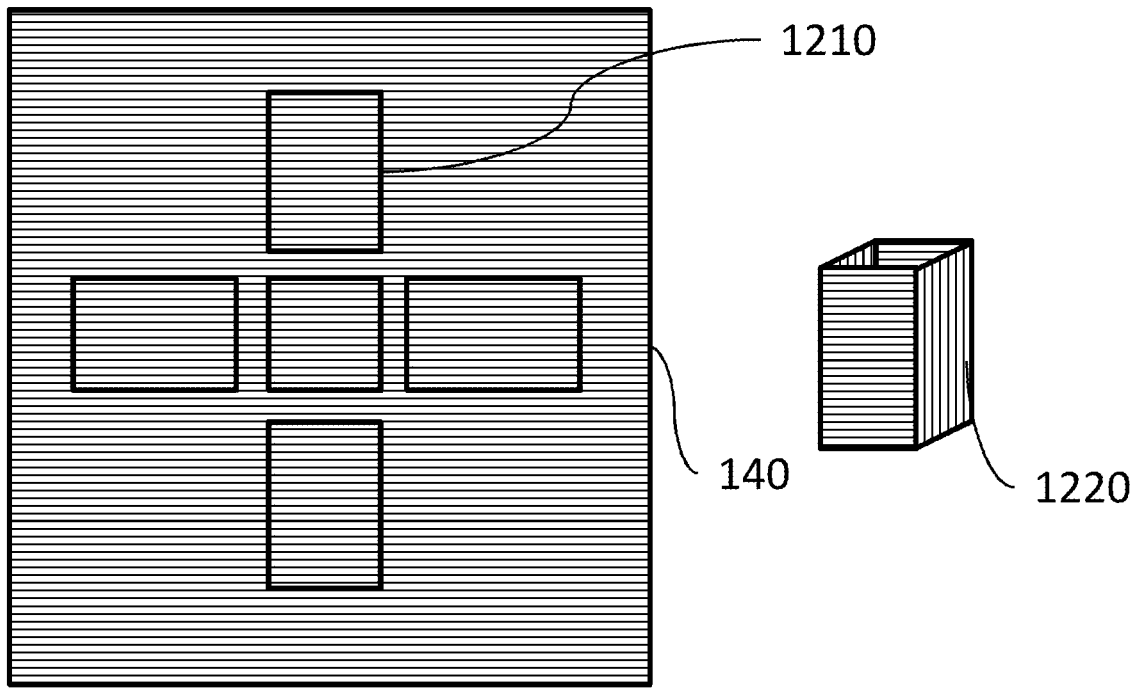
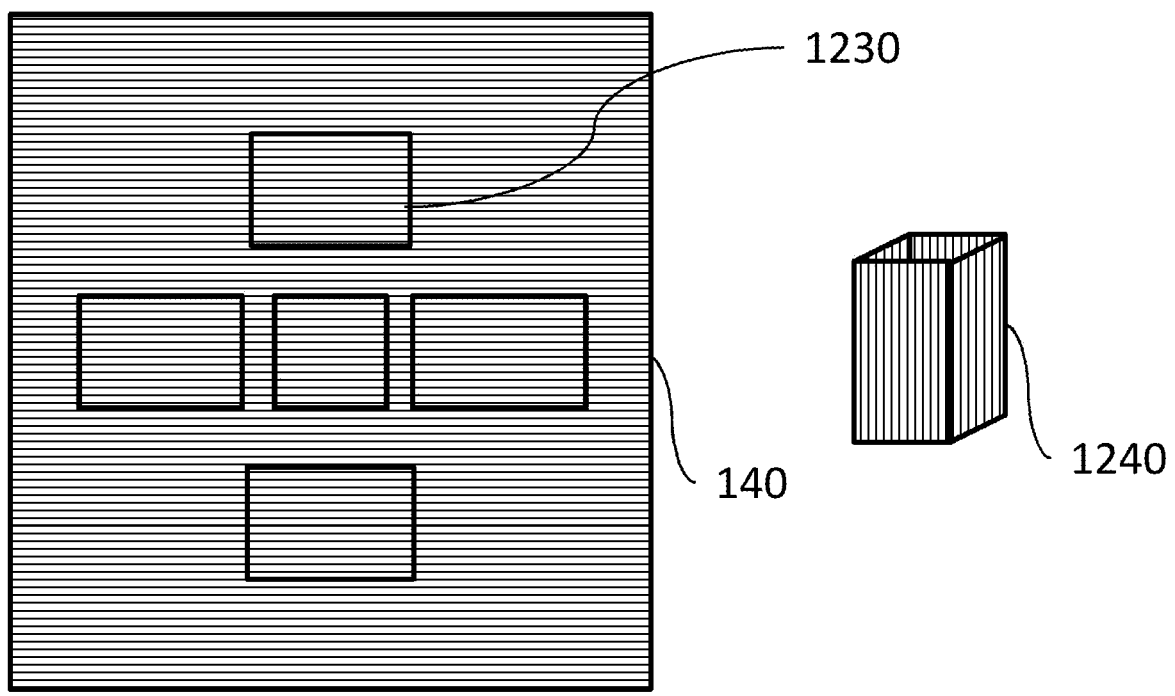
Fig. 12

1610 — Receiving at a control unit of a computer numerically controlled machine from a general purpose computer that is housed separately from a computer numerically controlled machine, an execution plan segment of an execution plan created at the general purpose computer, the execution plan segment defining operations for causing movement of a moveable head of the computer numerically controlled machine to deliver electromagnetic energy to effect a change in a material within an interior space of the computer numerically controlled machine, the execution plan segment further comprising a predefined safe pausing point from which the execution plan can be restarted while minimizing a difference in appearance of a finished work-product relative to if a pause and restart are not necessary

1620 — Determining that the execution plan comprises a next execution plan segment to be executed after the execution plan segment

1630 — Pausing the operations at the predefined safe pausing point until the next execution plan segment is fully received

1640 — Commencing operations of the computer numerically controlled machine defined in the execution plan segment only after determining that the execution plan segment has been received up to and including the predefined safe pausing point by the computer numerically controlled machine

Fig. 16

CLOUD CONTROLLED LASER FABRICATION

CROSS-REFERENCE TO RELATED APPLICATIONS

This application is a continuation of U.S. patent application Ser. No. 16/442,198 filed on Jun. 14, 2019, entitled "CLOUD CONTROLLED LASER FABRICATION," which is a continuation of U.S. patent application Ser. No. 15/334,120, now U.S. Pat. No. 10,379,517, filed on Oct. 25, 2016, entitled "CLOUD CONTROLLED LASER FABRICATION," which is a continuation of Patent Cooperation Treaty Application No. PCT/US2016/017904 filed on Feb. 12, 2016, entitled "CLOUD CONTROLLED LASER FABRICATION," which claims priority to U.S. Provisional Patent Application No. 62/115,562 filed Feb. 12, 2015; U.S. Provisional Patent Application No. 62/115,571 filed Feb. 12, 2015; U.S. Provisional Patent Application No. 62/222,756 filed Sep. 23, 2015; U.S. Provisional Patent Application No. 62/222,757 filed Sep. 23, 2015; and U.S. Provisional Patent Application No. 62/222,758 filed Sep. 23, 2015. The entire contents of these applications are incorporated herein by reference in their entirety.

TECHNICAL FIELD

The subject matter described herein relates to manufacturing processes implementing, or aided by, distributed processing of CNC machine data.

BACKGROUND

Manufacturing systems, such as "3-D" printers, laser cutters, CNC machines, and the like, can be used to create complicated items where traditional manufacturing techniques like moldings or manual assembly fail. Such automated methods receive instructions that specify the cuts, layers, patterns, etc. before a machine begins construction. The instructions can be in the form of computer files transferred to the memory of a computer controller for the machine and interpreted at run-time to provide a series of steps in the manufacturing process.

SUMMARY

In one aspect, a method includes receiving an execution plan segment of an execution plan created at a general purpose computer. The receiving occurs at a control unit of a computer numerically controlled machine, and the general purpose computer is not part of the computer numerically controlled machine (e.g. it is housed separately from the CNC machine). The execution plan segment defines operations for causing movement of a moveable head of the computer numerically controlled machine to deliver electromagnetic energy to effect a change in a material within an interior space of the computer numerically controlled machine. The execution plan segment further includes a predefined safe pausing point from which a clean restart of the operations of the execution plan can be performed. In other words, the predefined safe pausing point is one from which the execution plan can be restarted while minimizing a difference in appearance of a finished work-product relative to if a pause and restart are not necessary. The method further includes commencing operations of the computer numerically controlled machine defined in the execution plan segment only after determining that the execution plan segment has been received up to and including the predefined safe pausing point by the computer numerically controlled machine.

In some variations one or more of the following features can optionally be included in any feasible combination. A method can include determining that the execution plan comprises a next execution plan segment to be executed after the execution plan segment, and pausing the operations at the predefined safe pausing point until the next execution plan segment is fully received. A method can include determining that the next execution plan segment is fully received, and restarting the operations of the execution plan from the predefined safe pausing point according to the next execution plan segment after the determining. The execution plan can include a motion plan defining movement of the moveable head and control commands for operation of one or more other components of the computer numerically controlled machine. The one or more other components can include one or more of a laser, a power supply, a fan, a thermal control system, an air filter, a coolant, a coolant pump a light source, a lock, a camera mounted on the moveable head, and a camera mounted inside the interior space but not on the moveable head. A method can include receiving, at the computer numerically controlled machine, a forecast of variations in sensor data to be generated by one or more sensors of the computer numerically controlled machine during the operations of the execution plan segment, and comparing actual data from the one or more sensors with the forecast. The forecast can be based on expected electrical, optical, mechanical, and thermal results of the operations of the execution plan.

In another interrelated aspect, a method includes a control unit of a computer numerically controlled machine receiving a part of an execution plan created at a general purpose computer that is housed separately from (e.g. not part of) the computer numerically controlled machine. The execution plan defines operations for causing movement of a moveable head of the computer numerically controlled machine to deliver electromagnetic energy to effect a change in a material within an interior space of the computer numerically controlled machine. State data are recorded for a plurality of subsystems of the computer numerically controlled machine while performing operations of the computer numerically controlled machine defined in the execution plan. The operations are paused at a point of the execution plan upon determining that a next part of the execution plan to be completed has not been received. The operations of the execution plan are subsequently restarted from the point, and the restarting includes performing one or more actions to place the computer numerically controlled machine back into its state at the point based on the recorded state data before resuming with the next part of the execution plan after it has been received.

In another interrelated aspect, a computer numerically controlled machine includes a network connection over which the numerically controlled machine receives data, a moveable head configured to deliver electromagnetic energy to effect a change in a material within an interior space of the computer numerically controlled machine, and a controller configured to perform operations. The operations include receiving an execution plan comprising a motion plan via the network connection, and causing the moveable head to execute actions defined in the motion plan. Other operations, such as for example those discussed elsewhere herein, can optionally also be performed by the controller.

In some variations one or more of the following features can optionally be included in any feasible combination. The execution plan can include a motion plan defining a temporal element indicating times or time offsets at which each action necessary to create fabricated result should occur. The motion plan can be precomputed at a remote computer in communication with the network connection of the computer numerically controlled machine over a network that is at least one of lossy and having variable latency and/or having variable bandwidth. The network can be, for example, the Internet.

In another interrelated aspect, a computer numerically controlled machine includes a moveable head configured to deliver electromagnetic energy to effect a change in a material within an interior space of the computer numerically controlled machine, and a control unit configured to perform operations that enable operation of the computer numerically controlled machine using an execution plan delivered to the computer numerically controlled machine over a lossy and/or variable latency and/or variable bandwidth network connection.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is an elevational view of a CNC machine with a camera positioned to capture an image of the entire material bed and another camera positioned to capture an image of a portion of the material bed, consistent with some implementations of the current subject matter;

FIG. 3A is a diagram illustrating one example of an SVG source file, consistent with some implementations of the current subject matter;

FIG. 3B is an example of a graphical representation of the cut path in the CNC machine, consistent with some implementations of the current subject matter;

FIG. 3C is a diagram illustrating the machine file corresponding to the cut path and the source file, consistent with some implementations of the current subject matter;

FIG. 9 is a process flow chart illustrating a method for determination of a safe pause point in a motion and/or execution plan for a CNC machine, consistent with implementations of the current subject matter;

FIG. 11 is a diagram illustrating a material overlay for previewing a project, consistent with some implementations of the current subject matter;

FIG. 12 is a diagram illustrating a collection of 2-D patterns previewed as a three dimensional object, consistent with some implementations of the current subject matter;

FIG. 16 is a process flow chart illustrating features of a method consistent with implementations of the current subject matter.

When practical, similar reference numbers denote similar structures, features, or elements.

DETAILED DESCRIPTION

Figure 2:
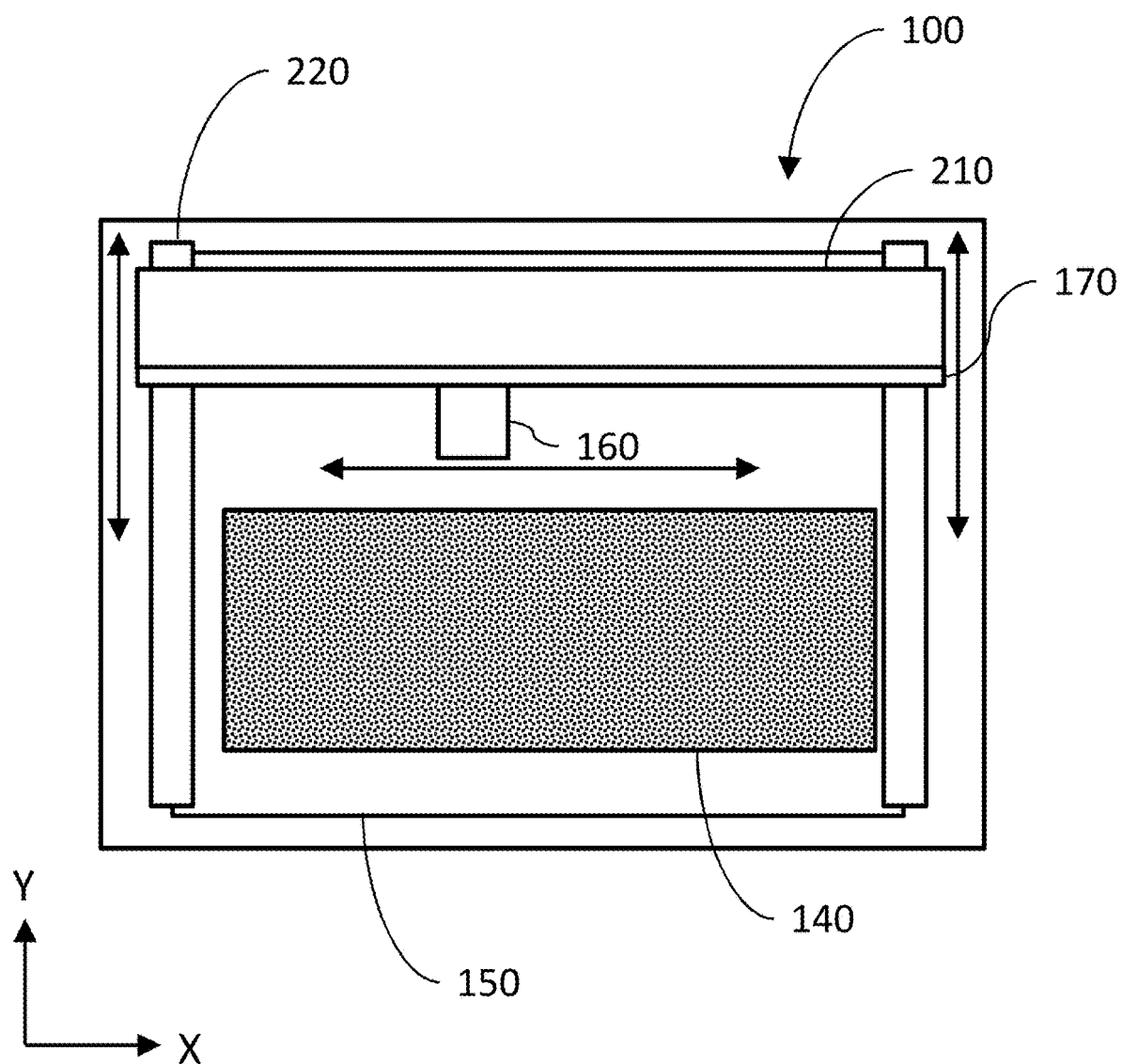
FIG. 2 is a top view of the implementation of the CNC machine shown in FIG. 1.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a .JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
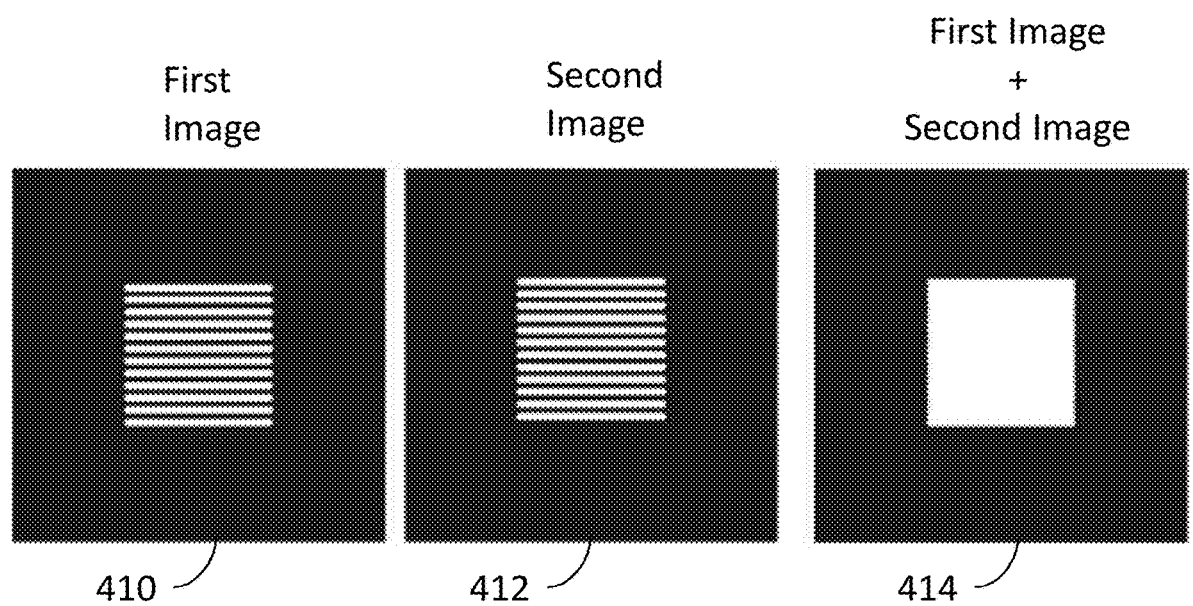
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
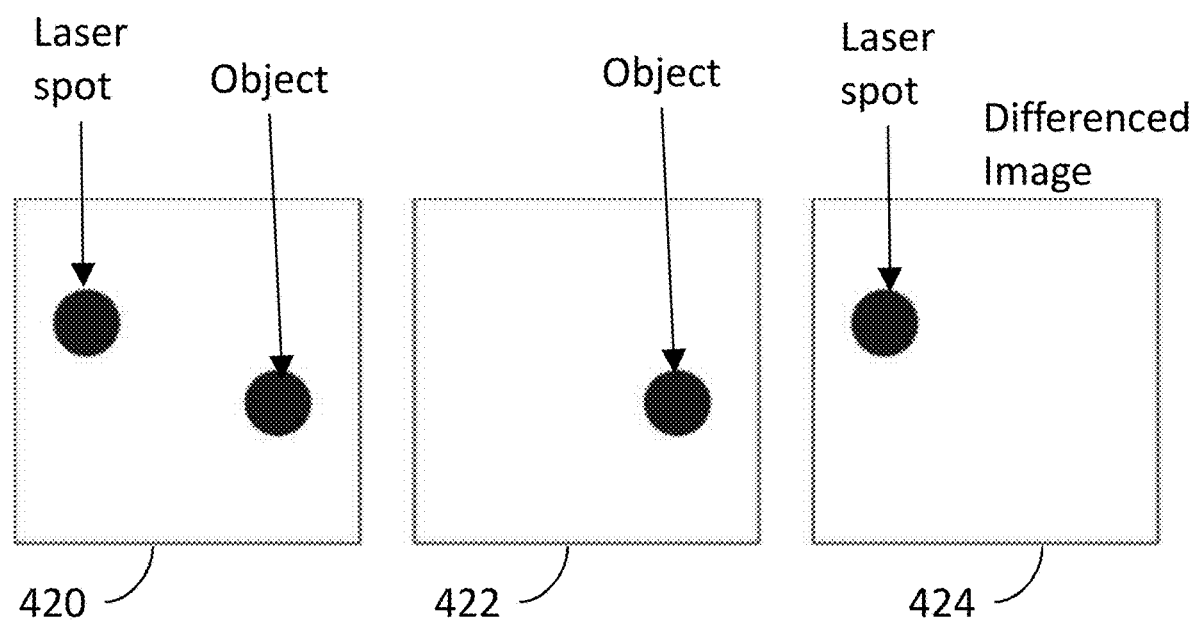
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
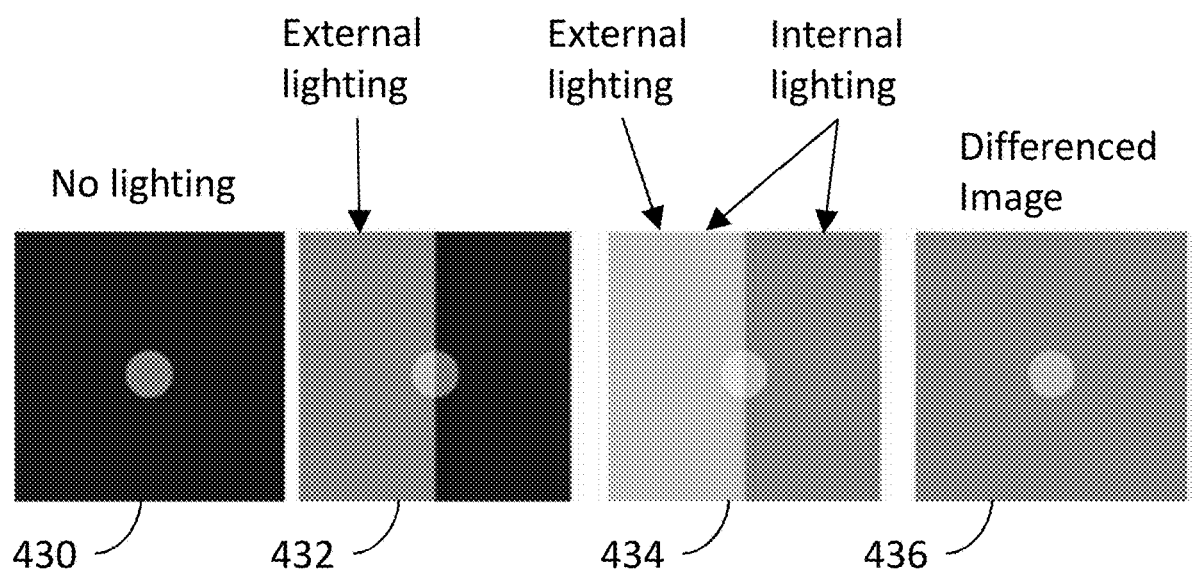
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a rangefinding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $1/60^{th}$ of a second, or less than $1/120^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Network Configuration

Figure 5:
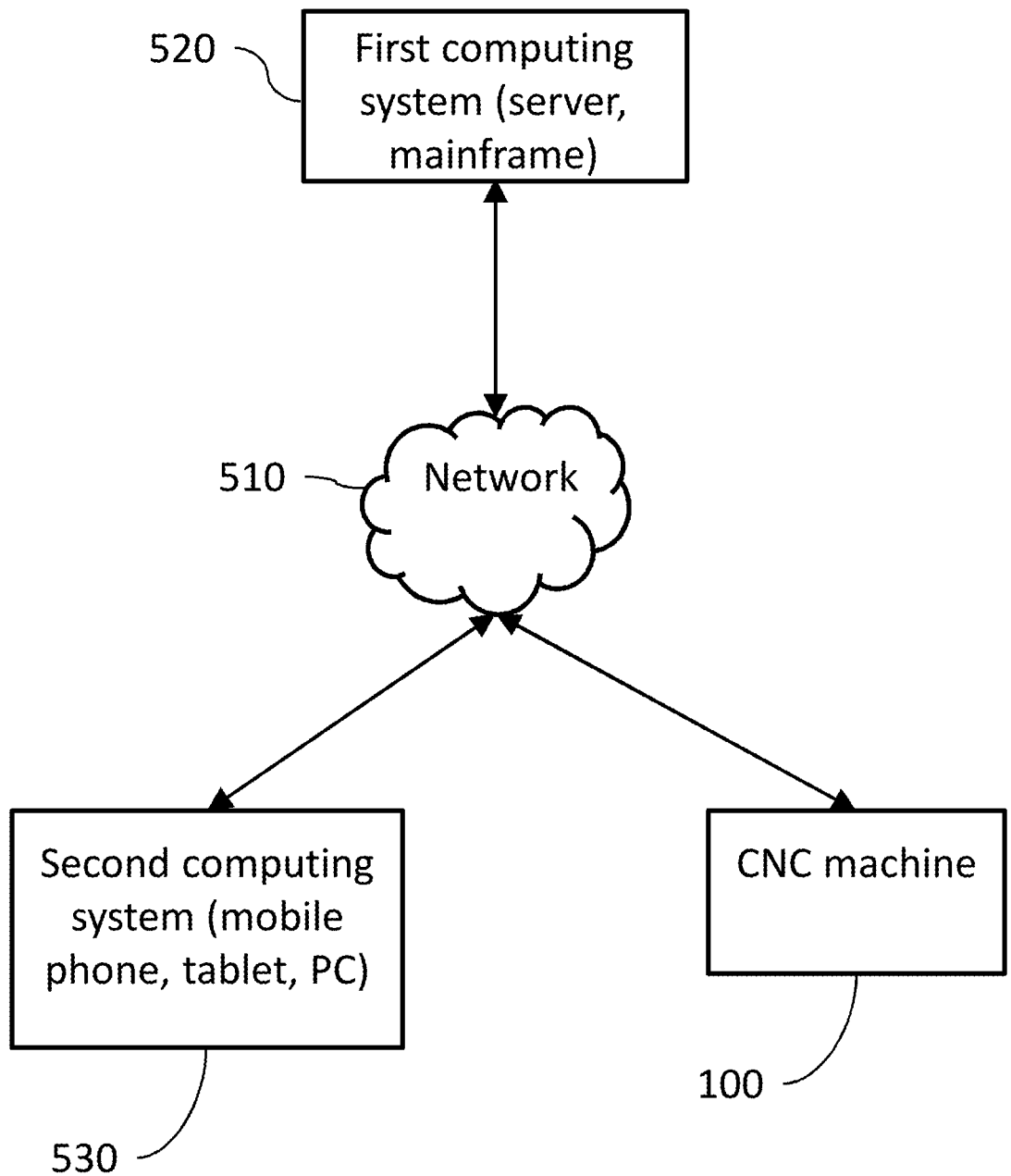
FIG. 5 is a diagram illustrating a cloud-based system supporting operation of a CNC machine, consistent with some implementations of the current subject matter.

FIG. 5 is a diagram illustrating a cloud-based system supporting operation of a CNC machine 100, consistent with some implementations of the current subject matter. By taking the most computationally expensive steps in the process described herein and distributing them over a network 510 to distributed computers, several advantages can be realized. The cloud-based system can include any number or combinations of first computing systems 520 (servers, mainframes, etc.) to provide powerful computation services. There can also be smaller second computing systems 530, for example, mobile phones, tablet computers, personal computers, etc. where users can access and interact with the system. Both the first computing system 520 and the second computing system 530 can be connected by the network 510 to each other and to any number of CNC machines. The network 510 can be a wired or wireless network.

Distributed Motion Plan Generation

The source file can be processed by the server to generate the instructions required by the CNC machine 100 in order to execute operations that will result in the desired product. The server can transmit the instructions to the CNC machine 100 without requiring the user to have any direct contact with the CNC machine 100.

Because the server can be a more powerful computer than the remote computer, more detailed motion planning calculations can be performed. The server can contain data on the physics of the CNC machine 100 that will be doing the fabrication, for example, cutting/layering parameters, machine information, material restrictions, etc. Advanced computational methods can be used to generate the motion plan, for example optimizing the motion of the head to not only generate an accurate set of instructions, but instructions that are executed in a minimum amount of time given a particular CNC machine. Conversely, the instructions may be optimized to minimize noise created by fans (by generating less heat, smoke, or debris by operating more slowly), they may be optimized to create minimum vibration (for a machine on an unstable surface, like a card table), they may be optimized for maximum accuracy and precision at the cost of speed, and/or they may be optimized for maximum speed at the expense of accuracy. The particular path chosen by the machine in moving from machining operation to machining operation is a complex problem and can be likened to the "travelling salesman" problem which has been proven to be NP-complete. Depending on the desired outcome, different optimizations can be used. For example, a nearest neighbor approach can be used to perform one set of motions, move to the location of the next set of motions, execute those, and so on. While being a simple algorithm, this may not be optimal when considering the fact that the motors have a finite acceleration and also given the feedback response of the cutters, pourers, etc. More sophisticated algorithms such as the Christofides algorithm can be used but the complexity of the calculation makes it best-suited to computation on the server, rather than requiring a powerful computer to be installed with every CNC machine.

Also, time-varying features associated with adding or subtracting material 140, such as head acceleration, variable laser burn, dulling of cutting surfaces, variations in flow rates of deposition materials, etc. can be calculated and accounted for when generating the motion plan by software on the server.

Once the motion plan has been generated on the server, the motion plan can be transmitted to the CNC machine 100 where the instructions will be executed. Continuous communication with the server during the execution of the operations can allow the use of image recognition programs to monitor the process. For example, corrections can be made due to machine error, observed defects in the material 140, or on the basis of feedback as to the progression of the operations. In one example, the image processing system may detect that an anomaly has caused a part to be cut slightly larger than specified; the machine may be instructed to go back and recut the part slightly smaller.

Figure 6:
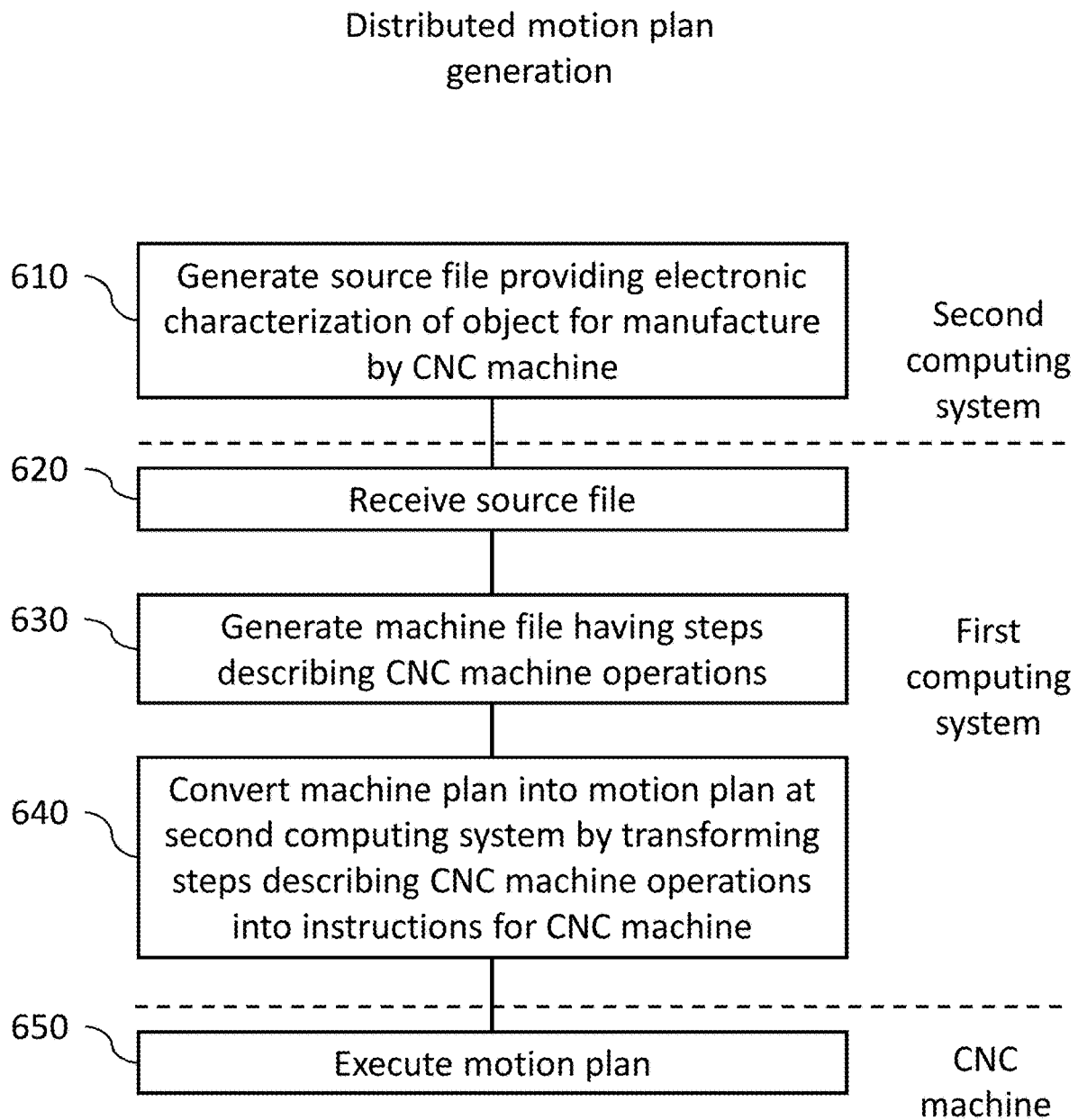
FIG. 6 is a process flow chart illustrating generating a motion plan for a CNC machine on distributed computing systems, consistent with some implementations of the current subject matter.

FIG. 6 is a process flow chart illustrating generating a motion plan for a CNC machine 100 on distributed computing systems, consistent with some implementations of the current subject matter. At 610, source files can be generated by providing an electronic characterization of an object for manufacture by the CNC machine 100. The source files can be photos, screen captures, electronic tracings, CAD drawings, etc. The source files can be sent to the first computing system by, for example, uploading to a server, etc.

At 620, source files can be received by the first computing system.

At 630, a machine file can be generated at the first computing system. The machine file, as described above, can include steps describing operations of the CNC machine 100.

At 640, the machine file can be converted into a motion plan by the first computing system. Also as described above, the motion plan can be a set of instructions for the CNC machine 100.

At 650, the motion plan can be transmitted to the CNC machine 100 over a network.

Figure 7:
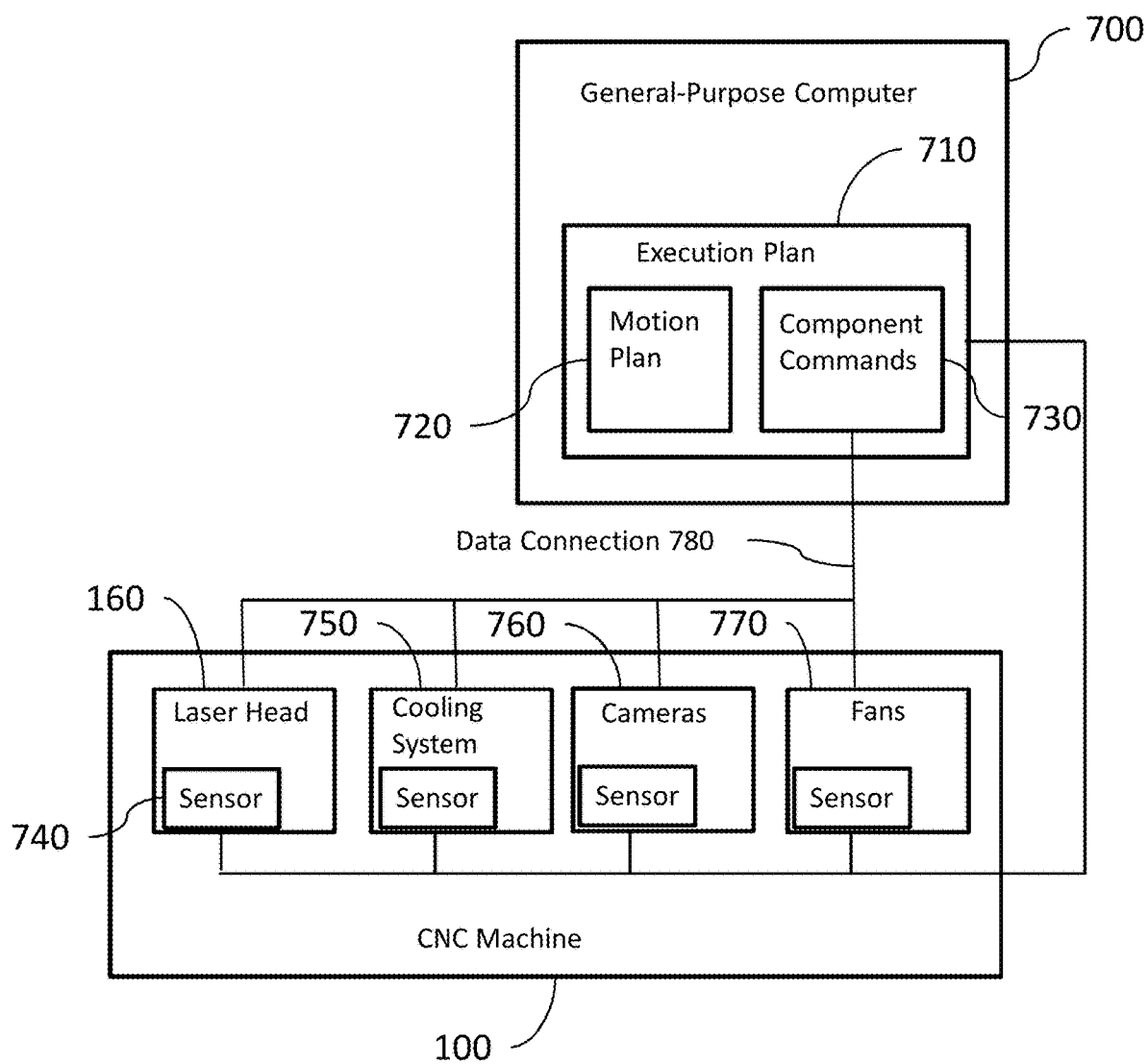
FIG. 7 is a system diagram illustrating general purpose computer executing an execution plan to control a CNC machine, consistent with implementations of the current subject matter.

FIG. 7 is a system diagram illustrating general purpose computer executing an execution plan to control a CNC machine, consistent with implementations of the current subject matter. There can be an execution plan 710 that not only includes the motion plan 720, but also includes component commands 730 for selectively activating other components and controlling their operation, such as when to turn fans 770 on or off, what speed to run fans, settings for the cooling 750 or ventilation system, when to activate cameras 760, what images to acquire, etc. The execution plan can be related to known or expected sensor data, stored locally on the CNC machine 100 or accessed from a database over a computer network or data connection 780.

The cooling system can include a coolant pump, a liquid refrigeration unit, a fan, a heat sink, or the like.

The generation of the execution plan 710 can occur on the CNC machine 100 or on a general-purpose computer 700 in communication with the CNC machine over a data connection 780. Examples of general-purpose computers can include, for example, PCs, tablet computers, smartphones, laptop computers, etc. The data connection 780 can be, for example, the Internet, a wide area network, a wireless network, a USB connection, or a serial connection.

The execution plan thus provides a comprehensive description of the operation of the CNC machine. However, because the components in the CNC machine can affect the operation of each other, the execution plan can, in some implementations, be generated in an iterative manner to result in an allowable and consistent execution plan. For example, if a motion plan instructs the CNC machine to make a high speed cut, the execution fan can also include commands to turn on a fan to quickly clear the debris. However, the system can access sensor data associated with one or more sensors 740 at the head 160, the cooling system 750, the cameras 760, and/or the fans 770. If the system had accessed sensor data from similar past operations indicating, for example, that the fan could not operate to clear that type of debris quickly enough to make a proper cut, then the cut speed can be reduced to an acceptable level.

Realtime Motion Planner

Figure 8:
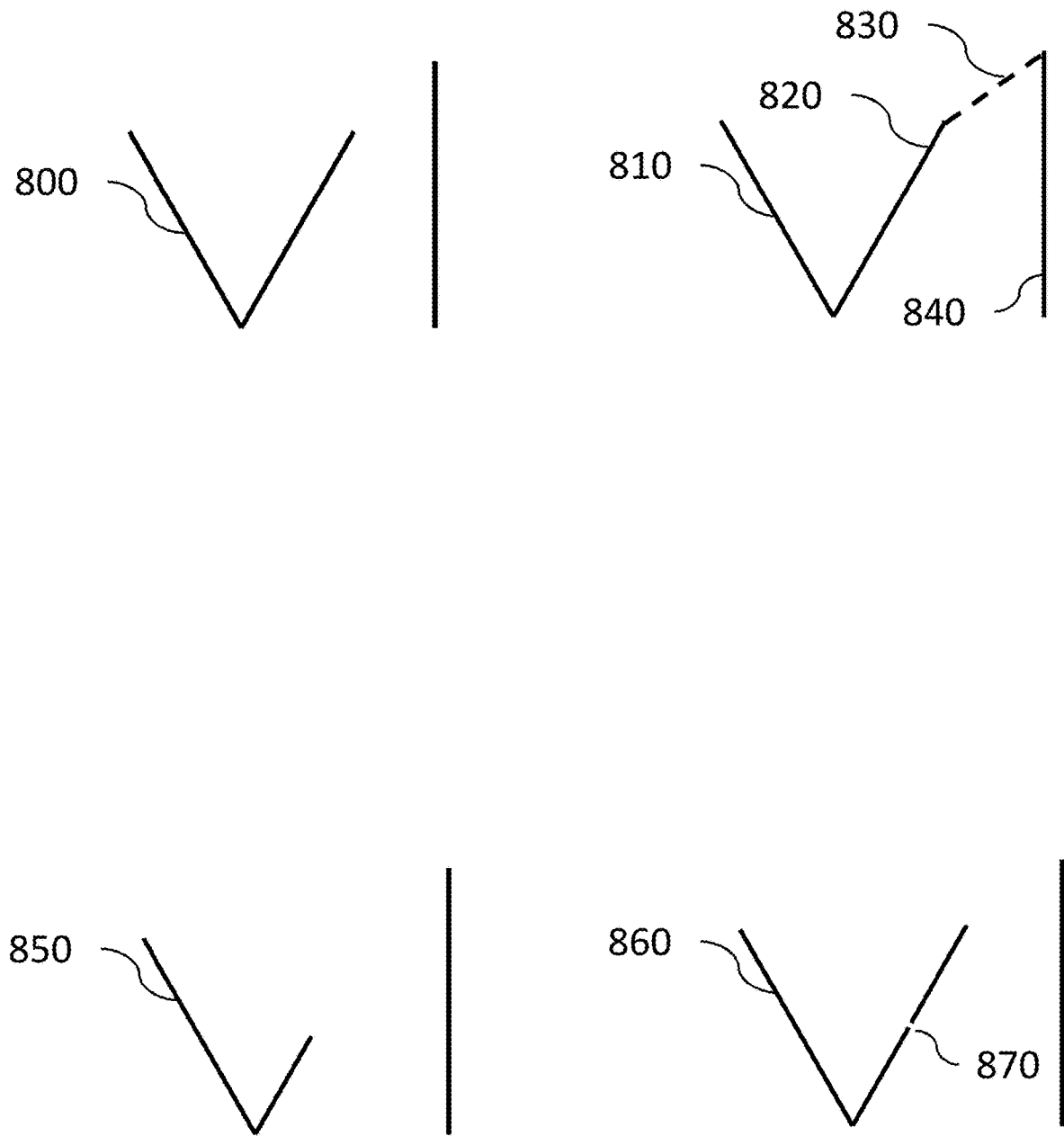
FIG. 8 is a diagram illustrating an example of determination of a safe pause point in a motion and/or execution plan for a CNC machine, consistent with some implementations of the current subject matter.

FIG. 8 is a diagram illustrating an example of determination of a safe pause point in a motion and/or execution plan for a CNC machine consistent with some implementations of the current subject matter. Currently available CNC machines typically operate by having a machine file, for example in the G-code language, loaded on to it. A motion planner executing on the CNC machine calculates the motions required by the actuators (such as steppers and servomotors) based on the machine file and causes execution of these motions in realtime or near-realtime. The execution of such a motion planner must be fast enough that it can generate new elements of the motion plan as quickly as the machine can execute them, and will often make tradeoffs in accuracy to ensure that it presents the next set of output data to the actuators when required. While there may be a small buffer in case of instantaneous delay, the design assumes that the motion planner is fast enough and coupled closely enough to the actual CNC machine that a loss of connection between the motion planner and CNC machine is not possible.

An alternate approach in which the CNC machine and the motion planner are separated is possible consistent with implementations of the current subject matter. In this case, the CNC machine and the one or more processors implementing the motion planner may be connected by a cable such as a USB cable or a network such as the Internet, a local area network, a wide area network, or the like. In such a configuration, the data connection between the motion planner and the CNC machine may be cut, data transmission may be slow or lossy (e.g. data packets might be delayed or lost), and/or other issues may affect reliability and timeliness of receipt of commands from the motion planner at the CNC machine.

Use of a motion planner implemented on a computing device separate from the CNC machine can present a number of challenges, including but not limited to handling of a connectivity difficulty between the two machines (CNC and motion planner) that occurs midway through a fabrication operation. Such an occurrence is unlikely in conventional approaches in which the motion planner is integrated into the CNC machine. In contrast, it is virtually guaranteed to occur when the motion planner is connected to the CNC via a network. When the motion planner is integrated in the CNC machine, an interrupted motion plan would result in the work aborting and tremendous manual effort required to restart it, with a likely outcome that the fabrication process does not turn out entirely as intended. For example, the laser might turn off suddenly, and realigning it so it can be restarted can be a manual undertaking that may result in noticeable imperfections.

Despite these challenges, a configuration consistent with implementations of the current subject matter in which the motion planner is not implemented on a same machine or on machine that is directly connected to the CNC machine can be highly desirable. CNC machines that incorporate the motion planner must include the motion planner in their cost, which can be a substantial price, especially for advanced motion planners that calculate second, third, fourth, and higher order derivatives of position and forces on the machine in order to minimize wear and provide optimal results. If the motion planner is connected via the Internet, it may be a resource that is shared among many machines. In another improvement that may be possible with one or more implementations of the current subject matter, CNC machines that integrate the motion planner generally impose a realtime requirement. In other words, they must include sufficient processing power to keep up with the motion of the machine. As a result, such motion planners can require a trade off between accuracy (performing more calculations per unit of time) and cost (including a more expensive processor that can complete those calculations). In another improvement that may be possible with one or more implementations of the current subject matter, using a separate motion planner can allow repurposing of a general-purpose computer, such as a high powered workstation or server in a cloud hosting provider, temporarily for the execution of the machining operation, before returning it to other, non-machining-related tasks.

The following describes two example approaches to addressing challenges that may arise with implementations of the current subject matter in which the motion planner and CNC machine are separated.

In a first approach, the motion planner can calculate the motion plan in motion plan or execution plan segments. Each segment contains the instructions to perform a series of useful machining operations, and then instructions to put the CNC machine in a state where it may be safely paused and then resumed. This state is referred to elsewhere herein as a safe pause point, and can optionally include a state in which a moveable head of the CNC device is not moving and/or moving but not cutting. Optionally, the safe pause point can be an end of the motion plan. A motion or execution plan segment consistent with this implementation of the current subject matter can be limited to the size of a buffer present on the CNC machine, so it may be loaded into that buffer in its entirety. A segment may contain the entirety of a machining operation, or it may contain a portion of it and the instructions to reach a next safe pause point.

A simple example is illustrated in the diagram of FIG. 8, which shows features of a machining operation that uses a laser cutter/engraver to engrave the letters "vl" 800. The required operations are as follows:

1) laser turn on instruction
2) downward-right line 810
3) upward-right line 820
4) laser turn off instruction
5) upward-right line 830
6) laser turn on
7) downward line 840
8) laser turn off Note that these are inputs to the motion planner; the output to the motion planner—the motion plan—is a series of instructions such as electrical impulses that can be used to direct the motors' and other actuators' operations. A typical motion planner would calculate the electrical impulses to implement these commands and send them to the machine in realtime. If the motion planner was suddenly disconnected from the laser during upward-right line 820, the material might be wasted. It might be possible to order the machine to continue the motion plan from the downward-right line 810, but then part of the plan would be performed twice, resulting in possible damage to the material as the laser revisited the already-processed material; alternately, the motion plan might be instructed to resume from the downward line 840, resulting in an incomplete machining operation 850.

While an interruption in communication between the motion planner and the CNC machine is relatively unlikely in the typical case of a motion planner integrated into the CNC machine, it can be fairly frequent occurrence if the CNC machine and motion planner are not integrated.

A segmented file consistent with implementations of the current subject matter can be created based on a consideration of a maximum buffer capacity of the CNC machine, which in the case of this example might hold the electrical impulses needed to implement the first six commands. Rather than sending the motion plan for all six commands to the laser, the motion planner can instead identify a point (or points) at which the execution of the motion plan could be paused and resumed without affecting the final output. In this example, that would be anywhere during the upward-right line 830 that occurs when the laser is off. The motion planner can therefore create a segment with the impulses for the first five commands and send this segment to the CNC machine. The CNC machine would wait until the motion plan for all five commands were stored in its buffer (e.g. until the full segment was received), and then execute the commands in the segment. Under normal operation, the motion planner would prepare and the machine would receive a second segment, completing the machining operation, before the first one was complete. However, if the motion planner were slow, for example an underpowered computer, or if the second segment were delayed, for example by network traffic, a network disconnection or failure (for example by someone tripping over the cable), then the CNC machine can be able to pause in a resumeable condition safely, with the laser off, awaiting further commands. It can be possible to include more data past the end of the segment, for example the start of the next segment, as long as the safe pausing point—the termination of the segment—is clearly identified should the full next segment not be received before reaching the end of the prior segment.

A second approach besides segmenting is also within the scope of the current subject matter. Instead of segmenting the motion or execution plan into one or more segments with a safe pause point, the CNC machine can be optimized to allow pausing and resuming at any point. This approach may still result in some perceptible physical effects of pausing and resuming in the final product. However, when applied carefully consistent with implementations of the current subject matter, such errors can be minimized.

To implement this second approach, the motion plan can be streamed from the motion planner in the usual fashion. However, if there is an interruption, the CNC machine can take responsibility for arranging for a "graceful" pause and subsequent resumption of operations. One or more of a number of tactics may be used to optimize this outcome. First, the machine may precisely note the time of the data interruption or identify the last instruction executed or the final piece of motion plan data fed to the motors. A sufficiently capable motion planner knows a great deal of information about the system at every instant: e.g. position, velocity, laser tube output power, etc. Provided with nothing more than the time at which data ceased to arrive or final instruction, it may be capable of calculating a new motion plan that can resume the machining operation with minimal disruption. For example, in the case of a laser, the motion planner may command a replay of the entirety of the motion plan up to the moment of interruption with the laser off, then turn on the laser very close if not precisely at the point in the motion plan at which the interruption occurred. Alternately, the motion planner may truncate the majority of the motion plan, and instead arrange for the moving components to achieve the correct position, speed, and other parameters necessary to resume the cut. Note that lasers affect materials based on their speed as well as their power, so it is not sufficient to simply locate the original position.

Second, with contact with the motion planner interrupted, the CNC machine may use a locally-generated or pre-calculated motion plan to bring the machine to a safe stop. This approach can include turning off the laser in the case of a laser cutter. A sudden stop can cause problems such as missed steps on a stepper motor, so the machine might instead bring the moving components to a gradual stop.

Third, at some point after the pause occurs, the CNC machine may use onboard sensors to detect a state of the system. For example, the CNC machine may use a camera to detect where the cutline ended, or position sensors to detect where the head is after shutdown, or other parameters that would assist with the system restart. Finally, a revised motion plan can be created and executed that, as closely as possible, resumes the state of the laser at the moment when the last data was executed. This approach may suffer from minor defects, such as a small break 870 on the right side of the 'v' in cut 860 as the resumed motion was not able to perfectly align with the previously terminated motion, but it can come close, in many cases imperceptibly so.

This approach may also be used for interruptions not caused by a disconnection from the motion planner. For example, existing laser cutters will shut off the laser immediately if their safety interlock is tripped, for example if the door is open. However, they do not have the ability to resume seamlessly if the user closes the interlock. The same safe-pause techniques may be used to arrange for a graceful resumption of machining after a user-induced stop.

Lasers are particularly well suited for this type of behavior, because they can turn off the laser at a moment's notice. Other types of machines have a lesser ability to 'pause' since, for example, the rotating bit of a mill must be stopped.

FIG. 9 is a process flow chart illustrating a method for determination of a safe pause point in a motion and/or execution plan for a CNC machine, consistent with implementations of the current subject matter.

At 910, a control unit of the CNC machine can receive, from a general purpose computer that is not part of the CNC machine, an execution plan segment of an execution plan. The execution plan can be created at the general purpose computer. Execution plan segments define operations for causing movement of a movable head of the CNC machine to deliver electromagnetic energy. The electromagnetic energy can effect a change in the material 140 within an interior space of the CNC machine. The execution plan segment can also include a predefined safe pausing point from which a clean restart of the operations of the execution plan can be performed.

At 920, operations of the computer numerically controlled machine, defined in the execution plan segment, can commence only after determining that the execution plan segment has been received by the computer numerically controlled machine. The receiving can be up to and including the predefined safe pausing point.

One User to Many CNC Machines

A pattern, source file, or other selection of operations to be executed by the CNC machine 100 can be initiated from a remote computer. The remote computer can be, for example, the first computing system 310, second computing system 320, or a computer local to the CNC machine 100. A list of available CNC machines can be provided by a server to the user of the remote computer to allow the user to select a desired CNC machine 100 for their project. Other graphical user interfaces (GUI's) can be provided by the server to the user of the remote computer to enable selection and use of connected CNC machines. Patterns, associated source files, and/or motion plans can also be stored on the server in a database. If desired, these or similar resources can be referenced by the user or the system instead of requiring that all the files and calculations be generated from scratch.

Many Users to One CNC Machine

A single CNC machine 100 can be accessed or controlled by a number of users. In one implementation, a group of users can transmit motion plans to the CNC machine 100. The motion plans can be conducted in sequence on different pieces of material 140, or conducted in sequence on the same piece of material 140. The motion plans from different users can also be combined into a single motion plan. Here, the CNC machine 100 can test for conflicts, or the testing can be performed at the local computer of the user downloading the motion plan or on an intermediate server. At any time, access to the CNC machine 100 can be restricted to registered users. Some features can have varying levels of permission. In one implementation, a user can be in control of their project, able to update the motion plan. Other users however, can be given access view the output of sensors in the CNC machine 100, for example, cameras, power output, temperature readings, etc. Here, video can be transmitted in real-time to users watching the manufacturing process even though they are unable to control it.

In any of the implementations described herein, the user (or users) can be contacted by the server, for example, to inform them that the CNC machine 100 needs attention, that an operation is completed, to provide updates as to the status of their project, etc. The form of contact can be, for example, text messages, mobile phone calls, email, mobile app notifications, etc.

Buffering

Coarse instructions can be transmitted continually by the server to the CNC machine 100. For example, for a large cuts or cuts at a very slow rate of speed, the server can transmit the motion plan, or part of the motion plan, in an open-loop manner, with no feedback from the CNC machine 100.

For fine work, control of the motion plan can be transferred to the CNC machine 100 in order to allow real-time feedback, particularly in situations where it is determined that latency will be a problem. The fine instructions can be performed with the aid of feedback, for example, camera data, sensor data, CNC machine 100 diagnostics, etc. The instructions can be performed in this closed-loop manner with the feedback altering the motion plan on the basis of the determined feedback. The types of commands that originate locally versus from the server can vary depending on the application or the specification from the user. Error-handling, image analysis from installed camera systems, verification of motion plans, etc. can be performed either at the server or at the CNC machine 100. Memory buffering can also be used to overcome some latency issues, for example sets of instructions can be compiled at the server and transmitted as a packet to the CNC machine 100. The CNC machine 100 can then execute the instructions while continuing to receive updates, thus not interrupting the machining process while waiting for the next instruction to arrive.

Portability Restrictions

Each CNC machine 100 is unique in that they have slightly different operation given the same set of instructions. This can be, for example, due to aging components, misalignments, environmental conditions, variation in makes or models of components, etc. The motion plan may be calculated with such variations taken into account. The motion planning code on the server can calculate the motion plan based in part on known facts about a given CNC machine 100, for example offsets, backlash in the belts or screws, motor acceleration capabilities, etc. and create or alter the motion plan accordingly. The motion planning code may also take into account details about the material being machined such as its location in the bed and the proper parameters necessary to machine it. As a result, the motion plan will work optimally on one machine, with one piece of material, and may not work as well or at all in other machines under other circumstances.

This architecture can differ from a design in which the CNC machine creates its own motion plan, in that it does not require the machine file (often implemented in G-code), which represents the abstract shapes needed to create the design, to be sent to the machine. Because the machine file is sufficient to create the product on any machine with a motion planner, ownership of the machine file gives control of the underlying intellectual property; ownership of the motion plan alone, however, is less useful. An analogy may be drawn to distributing the source code to a program written in a high level language, versus distributing compiled binary code that is only expected to function on a single class of computer. In this case, however, the "compiled" motion plan not only will work on only one class of machines, but may only work well on one singular machine, with one particular piece of material, in one particular location.

For example, if a user duplicates a motion plan intended for another machine, bypassing the motion planner, execution of the motion plan on any CNC machine 100 can be expected to have errors. To correct the errors, the user may be instructed to access a server to retrieve a correction to the motion plan or a new motion plan generated from the original machine or source file, in either case resulting in a motion plan optimized for that machine and the material the user intends to use. For example, if the user places material in the left side of the bed of a laser cutter and cuts a circle, and then duplicates the motion plan and gives it to another user, that user may place the material in the right side of the machine, in which case it may not be cut. The second machine might have a slightly less powerful laser, so the cut may not fully penetrate the material with the motion plan for the first machine. The user may be best served by generating a new motion plan for the cut they wish to perform or generating a set of variations to the motion plan for their specific machine.

Software/Firmware Updates

Creating motion plans on a server instead of the CNC machine 100 or a local PC allows for further advantages. The motion planning algorithms and code can be updated in one place and thereby instantly utilized whenever the server is used. Server software may be operated using containerization services such as Docker so that different versions or variations of the software may be easily started and stopped, with different variations used depending on the time, the user, the machine, or other factors. For example, new versions of the motion planning code can be tested on select machines by sending them motion plans from different software operating in different containers, with ease of toggling between established and proposed versions of the motion planning code.

In existing solutions, changes to the motion planner are reflected in code on the CNC machine. Since it is more time consuming and risky to modify code on the CNC machine, it makes it more difficult to update functionality related to the motion planner. This is because the code running on the machine ('firmware') typically controls safety functions, such as shutting down systems when errors occur, so any change could introduce errors with serious safety side effects. The server, by comparison, has fewer safety-critical functions, so may be updated more freely. Firmware programming is generally held to be slower than server programming, so implementing functionality in the server can make development faster in that way as well.

When functionality is moved to the server, it is less likely to be necessary to update the firmware, but it is still important and possible. The firmware may have an error, or new features may be introduced such as more robust anomaly detection or improved algorithms to control the lighting. When that is required, in one implementation, a small change can be sent to the CNC machine 100, for example, a change to a setting, instructions in memory, onboard data tables, etc. This small change might be downloaded with no interruption in the operation of the CNC machine 100. Another implementation can have the firmware update downloaded and swapped out in its entirety. Yet another implementation can have the CNC machine 100 power up with minimal firmware installed, only that required for contacting the server. The CNC machine 100 can then download the latest version before proceeding with operation. Yet another implementation can have the CNC machine store the firmware in volatile memory, so that it downloads the firmware from a server every time it boots, meaning that a firmware error can always be corrected by rebooting the device and downloading a new firmware.

Because the ability to update the firmware can allow an owner of that ability unrestricted use of the machine, it must be carefully secured. Techniques for doing this can include an encrypted connection, "secret" keys known either by the machine or the server or both, public keys known either by the machine or the server or both, and signatures to guarantee that a firmware update is from the appropriate source and is appropriate for the machine in question.

Local Confirmation of CNC Machine Instructions

In some implementations, the CNC machine 100 can require a local action or authorization before implementing instructions that may have been received from a remote computer. For example, the CNC machine 100 can require a user to physically push a button, switch, or other mechanical system, to initiate an operation the CNC machine 100. In one implementation, the switch can cause an electronic signal to be sent to the CNC machine 100 that the instructions can begin. Here, the electronic signal could, with proper access to the computing system in the CNC machine 100 be sent without the switch being activated. Alternatively, the computer in the CNC machine 100 can receive commands that set the CNC machine 100 into a state identical to one in which the switch had been activated.

In implementations where it is not desired that the switch be overridden or circumvented in the above manner, the switch can, also or instead, cause a mechanical connection to open or close, with the connection status being necessary for the instructions to be executed. Here, it is not possible for any remote system to cause the CNC machine 100 to operate in the desired manner because without the switch being physically activated locally by a user, the CNC machine 100 is effectively disabled. In another example, the switch could bypass the software running on the computer and energize elements of the CNC machine such as providing power to a laser or to motors. In this example, even someone who had modified the software on the machine would be incapable of causing it to start unattended. Further, while the switch might enable the operation of the laser and not allow any software means of so enabling it, disabling the switch can be allowed in software. If someone does not press the switch, the laser may not operate; but if someone does press the switch, the software can reset it, because of a detected anomaly, because of time elapsed, because the user has moved the material, etc.

The features of having a physical switch necessary for operation of the CNC machine can be incorporated into any CNC machine operations. They can be used with, for example, startup or shutdown, powering one or more components, initiation or continuation of a motion plan, confirmation of an update to a motion plan, opening or closing of the CNC machine lids/doors, control of any of the diagnostics in the CNC machine 100, activation of cameras, etc. In one example, a CNC machine 100 can be started or run remotely, with the exception of turning a laser on or off. Here, the laser can require local actuation of a button or switch to turn on or off. In this way, the CNC machine 100 can receive updates to motion plans, execute projects, and the like, while still requiring an on-site user to be directly involved in some operations of the laser system.

License and Account Management

Machines may also have "accounts" (distinct entities) on the server, with unique keys so that the server can communicate securely with them. These keys may be assigned by the server, for example when the machine is first powered up; drawn from the environment, for example a combination of date, time, and WiFi network settings; programmed at the factory, for example MAC address; or some other means.

A given piece of intellectual property, for example, a pattern to cut a product, can be assigned to one or more users, or machines, or bearers of properly-marked material. In the former case, a person may buy a pattern. In the second case, a user may buy a piece of material with a marking on it, for example a unique barcode, that entitles the bearer of the material to some intellectual property, such as a free pattern. In the latter case, a pattern may be "free" with the purchase of the machine, and any user who uses that particular machine has access to it.

Access to intellectual property can be granted by users to other users, for example, one user who owns the machine may have permission to delegate or license usage rights to another user. Usage can also be restricted geographically, to certain companies or individuals, etc.

The ability to machine a given piece of intellectual property may be limited to a certain number of times, to certain materials, to certain times or locales, or any other restriction that may be expressed in software. This could be enforced by the motion planner refusing to create a motion plan for intellectual property that was not properly acquired. For example, a user might purchase the right to print up to five wallets bearing the likeness of a well-known superhero. Once the fifth wallet is printed, no further motion plans for that wallet may be generated without further licensing payment.

Variations may be made for extenuating circumstances. For example, if the print was aborted, another attempt might be allowed. The aborted attempt could be verified through onboard cameras or sensors. If a user was dissatisfied with a print, the user could place the print in the machine to be imaged. The machine could then deface or destroy the failed print, and verify that the destruction occurred with a camera, before issuing a refund.

Analytics

At any time, the server can receive analytics data relating to usage of the CNC machine 100 or the performance of the CNC machine 100. Since all source files are submitted to the server, aggregated data can be compiled including source file or motion plan file size, the frequency of use of different features (e.g. engrave versus cutting), the frequency of use of different file types, and so on. Analytics related to the machine file can include which file types require the greatest amount of processing resources to compute, or which path algorithm is, on average, fastest to execute. Further analytics related to the motion plan can include the average speed at which the motors operate, the percentage of time that the laser is at full power, and the average cut time of the motion plan.

For example, it can be discovered that users are using the Y-axis more aggressively than the X-axis. A redesign of a subsequent version of the CNC machine 100 could be made to use stronger and more durable motors on the Y-axis. In the meantime, the motion plans could be changed so that the Y-axis motions are slower than X-axis, and use lower laser power to compensate for the reduced speed. In another example, it can be discovered that a certain user always cuts things in the top right corner of the bed. Since, over time, that can cause wear at a certain spot in the belts, a message can be sent to the user to tell them to place shapes in other areas to maximize belt life. Other analytics can include determining the types of projects that are most often abandoned by users, and then offer advice on how to improve the projects.

In another example, machine usage or information may be correlated with errors, returns, malfunctions, or other problems. For example, it may be determined that the majority of units that were returned with a stuck fan exhibited a characteristic vibration that was measured on the devices' accelerometers in the weeks before failure. Users who were experiencing the vibration could pre-emptively be sent replacement fans. In another example, it might be determined that machines that incorporate laser tubes from Supplier A have lower average output power than machines that use tubes from Supplier B. This would allow better future vendor selection.

Examples of Distributed Processes

Functions of the CNC machine 100, at various stages during the planning, setup, and execution of a project, can benefit by performing some processing on remote computing systems. As an example, if a user wishes to preview their project as it will appear when finished, 3-D rendering and overlaying of realistic material 140 textures from either a library (based on the identification of the material) or a camera (from a picture taken directly of the material) can be performed by fast servers and images transmitted to a user. Changes to a project, for example rearranging the layout of the pieces on the underlying material, can be quickly translated into an updated motion plan by taking into account how the new cutting pattern will be reflected in the final project. A motion plan can be analyzed in the context of the particular CNC machine 100 to determine if the motion plan will exceed machine motion limits. The motion plan can also be updated based on known, or real-time, determination of systematic errors or other characteristics of operation that may be unique to the particular CNC machine 100 executing the project.

Project Preview

Figure 10:
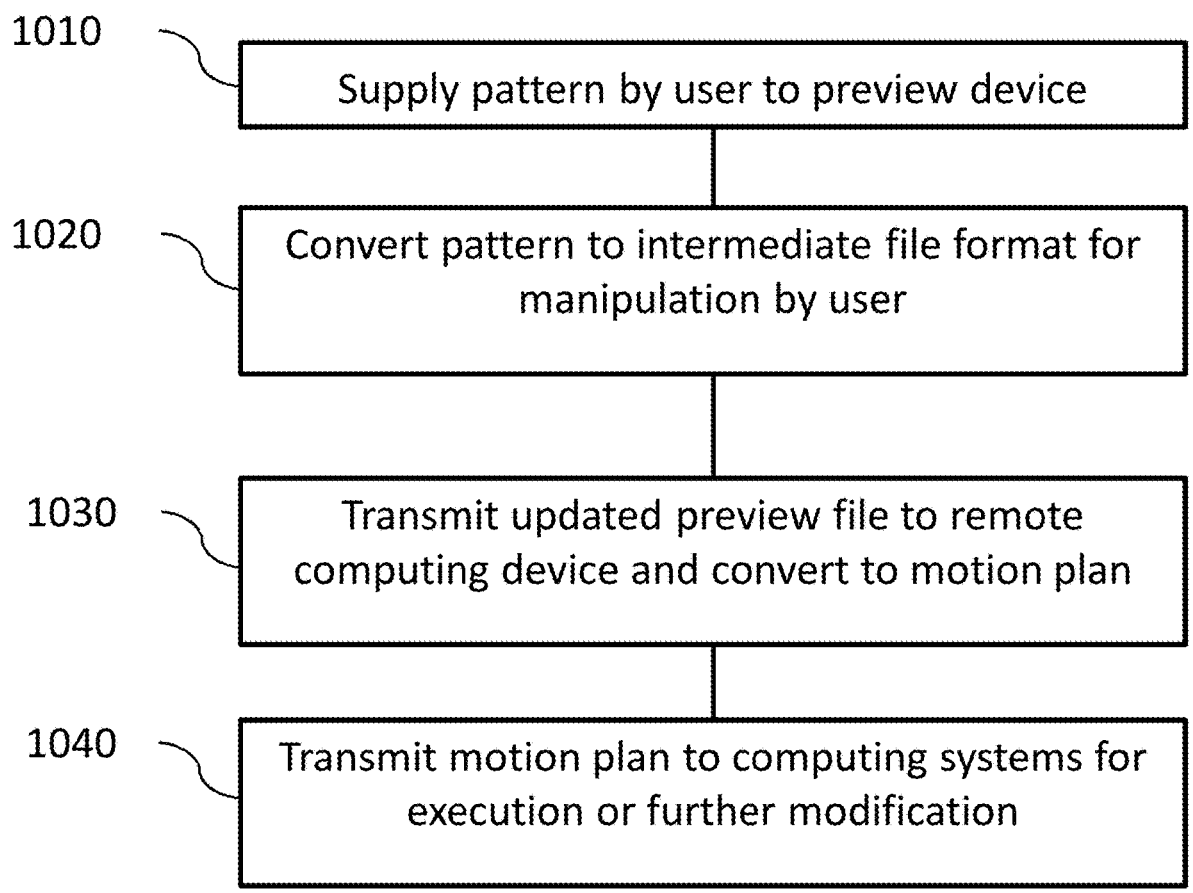
FIG. 10 is a process flow chart illustrating generating a project preview on a distributed computing system, consistent with some implementations of the current subject matter.

FIG. 10 is a process flow chart illustrating generating a project preview on a distributed computing system, consistent with some implementations of the current subject matter. In one implementation, a user can generate or supply patterns to be converted into a motion plan that the CNC machine 100 can execute. A pattern can be any visual representation of what it is that the CNC machine 100 is to cut, print, form, etc. The pattern can be a drawing, image, outline of a part, etc. The process can include: starting with a pattern, manipulating the pattern into a modified pattern, converting the modified pattern into a motion plan, and executing the motion plan by the CNC machine 100.

At 1010, the pattern can be supplied, for example by the user, to a preview device in the form of a pre-existing image file. The image file can be in any file format, for example, a JPEG, PDF, bitmap, Scalable Vector Graphics (SVG), etc. The preview device can be, for example, a mobile device, laptop computer, tablet computer, desktop computer, CNC machine 100, etc. The image file can also be the same as a source file, and vice versa. Here, we distinguish between an image file and a source file by generally assuming that the image file is not in a finalized state to be used as a source file.

Also, image files corresponding to the material 140 on which the pattern is to be cut can be specified by, for example, the user, imaged by the cameras in the CNC machine 100, identified from the watermark, etc. If images of the real material 140 are not being acquired by the cameras, then images of the material 140 can be accessed from a library or other database that stores images of materials. If the material 140 can be identified, for example by a barcode or by image recognition, then specific post-fabrication material 140 properties can be accessed. For example, a light colored wood may turn dark when a certain amount of laser power is applied; this can be determined for a more accurate preview of what the material 140 will look like post-fabrication. In one implementation, the material 140 is uniquely identified e.g. with a barcode and photographed at its point of distribution. The material 140 is then obscured with a protective layer. When the material 140 is inserted into the CNC machine 100, instead of showing the protective layer, the machine determines the material 140's unique identifier and retrieves the photograph, showing what the material 140 looks like underneath the protective layer. If called upon to preview a project with that material, it will use the stored image of the material's appearance in the preview.

At 1020, the pattern can, if needed, be converted to an intermediate format, for example, an SVG format, and sent to a web browser or other software program capable of manipulating SVG files. The received SVG file (or other appropriate file type) can be rotated, expanded, translated, or the like, by the native software in the receiving computer or by a remote server, and then either those transformations or the resulting transformed file may be returned to the server.

The image files for the material 140 can be combined with the pattern to provide a preview of what the cut will look like on the material 140. Additionally, the type of cut can be selected by the user and the preview updated accordingly. For example, the user can specify a cut depth for each point on the pattern. The cut depth can range from, for example, zero (or no effect) to 100 indicating a cut through the material 140. Again, a library or database of recorded cuts for the given material 140 can be accessed in order to show what the cut will look like, for example, with the specified depth, on the specified material 140. Additional features of the preview can include showing effects of laser power (scorching), varying the spot size of the laser, etc. For applications involving 3-D printing, the preview can include, for example, displaying the pattern as it is built up, showing the necessary buttressing to support the pattern, etc.

Notes or other instructions can be generated during the preview and appended as metadata to the source files used to generate the motion plan, for example, comments, instructions, etc. Some metadata can be converted into a portion of the motion plan while other metadata can be stored for later reference and associated with the motion plan.

At 1030, the manipulated or updated preview can be used to modify or update the source files, for example the SVG files, used to generate the motion plan. Data corresponding to the preview can be transmitted to a remote computing device, for example, a server, mainframe, cloud network, etc. Once transmitted, the manipulated preview can be converted to back to its original file type, another file type, or to a motion plan.

At 1040, the motion plan can be transmitted to one or more computing systems, CNC machines, etc. The motion plan can then be executed or modified by the local machine as needed.

Material Overlay

FIG. 11 is a diagram illustrating a material 140 overlay for previewing a project, consistent with some implementations of the current subject matter. A graphical representation of what a finished project will look can be displayed on a preview device. The preview device can, for example, be a mobile device, a tablet computer, a desktop computer, a screen integrated with the CNC machine 100, etc. In one implementation, images of a pattern, for example an outline of a cut, can be overlaid with images of a material 140, for example from the CNC machine 100 or from a data library. The pattern can be modified by the user based on a rendering of the pattern on the material 140. In the example of FIG. 11, the top portion shows material 140 with a pattern 1110 overlaid upon it and the grain running the short way across each piece of the pattern 1110. If a user wished the pieces to have a grain running the long way across each piece of the cut pattern, then the pattern can be rotated as shown in the bottom portion of FIG. 11 resulting in the desired pattern 1120.

3-D Preview

FIG. 12 is a diagram illustrating a collection of 2-D patterns previewed as a three dimensional object, consistent with some implementations of the current subject matter. In one implementation, 3-D visualization can be combined with a material 140 preview to render what the finished product will look like given a particular material 140. First, a 3-D design can be provided by, for example, a scan by the CNC machine 100, a data file by the user, etc. Then, a 2-D representation of the pattern to be cut on the material 140 can be generated to construct the pieces necessary to construct the 3-D product. For example, if a box was imaged, then the pattern would show five pieces, the four walls and the bottom.

The material type of the material 140 can be specified or scanned and an image of the material 140 then integrated with the cut pattern. One way in which the material 140 can be scanned is by placing the material 140 in the CNC machine 100 and imaging the material 140 with the cameras. Also, any watermarks, if present, that specify material appearance or other properties can also be acquired. If no scan of real material 140 is available, then a material 140 can be selected from a library or other database storing known or standard characteristics for particular materials. Once known, the features of the material 140 can be included in the preview image to show, for example, colors, grain, knots, etc.

The combination of the pattern and preview of the material 140 can be rendered as a 3-D image to show what the final product will look like when assembled. This can allow the user to interactively manipulate the preview to, for example, orient portions of the 2-D representation to capture a particular grain pattern, avoid defects in the material 140 surface, etc. Once the user has finalized the preview, data representing the user-defined cut pattern can be uploaded to the cloud, the CNC machine 100, or other connected computing system. When the preview stage is complete, any adjustments made by the user to the layout are taken into account. The process can then proceed by, for example, generating the motion plan.

One example of using the material 140 overlay feature is shown in FIG. 12. Here, a pattern 1210 for a tall box is shown on a material 140 with a horizontal grain. After the user specifies the pattern 1210 on the material 140, a three-dimensional preview 1220 can be generated showing the finished product and including the features of the material 140, in this case the grain. When assembled according to the pattern 1210, the three-dimensional preview 1220 would show a box with sides that have both horizontal and vertical grain patterns. To correct this, the user can manipulate the pattern 1210 to arrive at the pattern 1230. After doing so, the generated three-dimensional preview 1240 would show a box with the grain patterns all being vertical.

In another implementation, the extents of the material 140 can be identified by imaging the material 140 and analyzing the resultant images. For example, if the material 140 has a known image, such as being associated with a specific product, the material 140 can be identified from archived images of the product. High-contrast features can be used to identify candidate material 140s, for example, features of grain, texture, reflectivity, etc. There can be a pattern underneath the material 140, such as a hex pattern on the support or bed of the CNC machine 100. When material 140 on the pattern is imaged, missing portions of the pattern can be used to determine the extents of the material 140.

Once the extents of the material 140 are identified, the cut pattern can be located inside the material 140 with the preview or automatically when generating the motion plan. If a user attempts to execute a motion plan that extends outside the extents of the material 140, a warning can be provided. Alternatively, the CNC machine 100 can be configured to not allow motion plans to be executed outside a defined material boundary.

Kerf Management

Subtractive CNC machines such as CNC mills, lasers, plasma cutters, and water jets remove a thin strip of material when cutting, called the "kerf". For example, in a laser with a 0.01" kerf, cutting a 1" square in a piece of material yields a 0.995" square and a 1.005" hole, as the laser cuts down the centerline and removes 0.01" of material split evenly between the center and the outside. This can be clearly undesirable in some applications, as complex calculations must be made to ensure that parts intersect and join properly. In another implementation, a user can select what part of a cut pattern corresponds to "project" (the dimensions that should be accurate) and what corresponds to "scrap" (the dimensions that will be affected by kerf). The selection can occur, for example, in the preview, by marks on the material 140, etc. For example, if the user was creating a 1" square, the user can indicate that with a filled-in one inch square. If the user wanted a 1" hole, they can create a large filled-in shape with an unfilled 1" hole, with the unfilled portion designated as scrap.

One challenge with a laser as compared to a CNC mill is that the kerf width depends on a large variety of factors, including the material, the laser power, the ambient temperature, the cut speed, the lens chosen, the focal distance, and more. By comparison, a ⅛" end mill can be expected to consistently remove a ⅛" path of material, regardless of the material chosen. Calculating and accounting for kerf width is a critical challenge that no laser has solved. For example, if a piece made of wood is to mate properly with a piece made of acrylic, their different kerfs must be taken into account. However, in this invention, the kerf width can be calculated, for example, either by lookup with a known material 140, by measurement after cutting and inspecting, by manual entry by the user after a test cut and manual measurement, etc., and then automatically compensated for. The design and/or motion plan can be reorganized by the CNC machine 100 or other server-based computer program so that the material 140 perimeter is expanded by one half-kerf-measure, so the resulting project is exactly the right size, for example, either 1" square with a bigger hole, or a 1" hole with a smaller square.

Parametric Modelling

Figure 13:
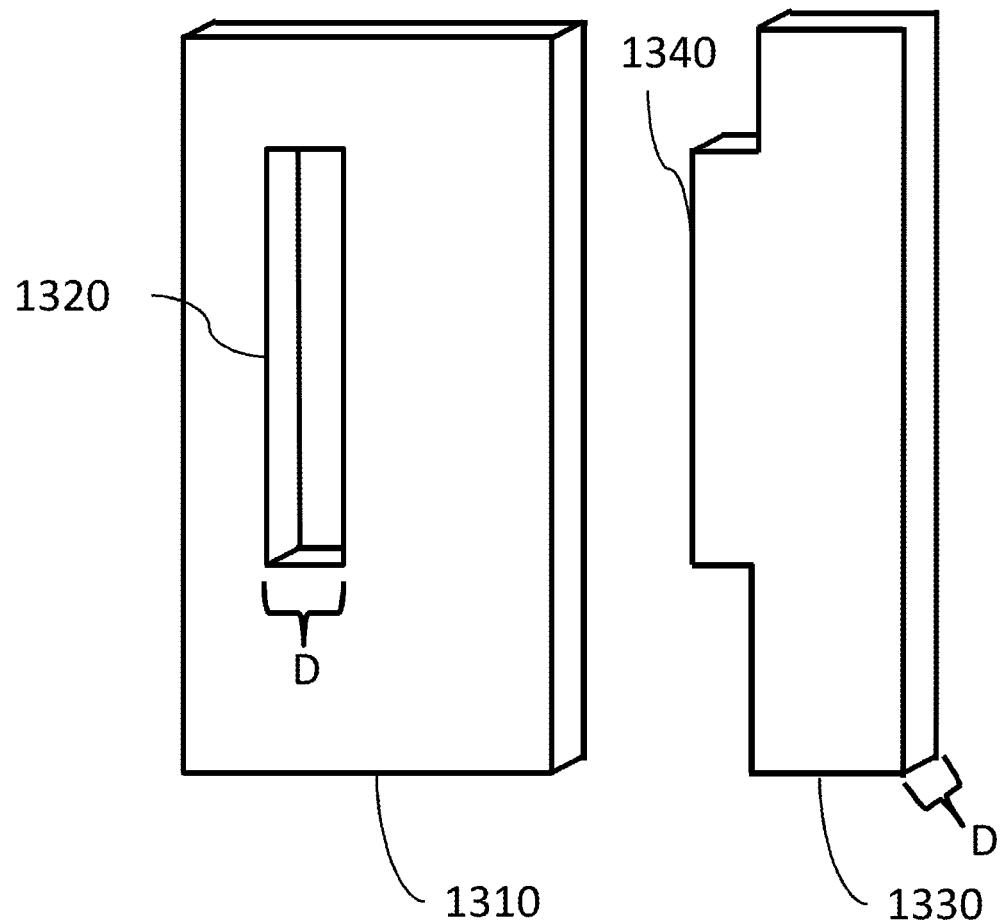
FIG. 13 is a diagram illustrating parametric modeling incorporated into a project preview, consistent with some implementations of the current subject matter.

FIG. 13 is a diagram illustrating parametric modeling incorporated into a project preview, consistent with some implementations of the current subject matter. Parametric modelling can describe constraining a first dimension of a portion of a pattern to a second dimension determined by the system or specified by a user. For example, there can be a pattern 1310 where a rectangular slot 1320 of width D is located in the pattern 1310. The user can specify that a second pattern 1330 is to contain a tab 1340 which will be inserted into the slot 1320. The width D of the tab 1340 is associated with the thickness D of the material 140 that the second pattern 1330 is to be cut on. Some variation can be specified, for example, a tight fit, loose fit, etc. Thus, the width D of the slot 1320 in the first pattern 1310 can be constrained to generally or precisely match the thickness D of the material 140 for the second pattern 830, after accounting for material removed by the kerf. For a given pattern of slots and tabs, the material 140 thickness can be, for example, determined automatically by having the CNC machine measure the material 140 and report the results back to the software that controls the parametric model. This is an improvement on traditional techniques, where if a parametric model was created, the parameters were abstract. In this invention, the parameters may be related to physical characteristics of the materials that may be determined by the machine via measurement or lookup. In so doing, it is possible for a complex three dimensional design to be cut reliably from material of varying thickness.

Any changes to the thickness of the material 140 can propagate through the patterns according the specified constraints. This can be a computationally intensive operation if many cut dimensions need to be adjusted and/or re-optimized. Making such changes is an operation well-suited to being performed by a server. The updated patterns can then be displayed as part of the preview. Also, if changes to a dimension cause a constrained dimension to violate a pre-defined rule, an alert can be provided to the user. For example, it can be verified that a dimension is not too small or large (too small to be cut or too large to fit on the material 140), that portions of the pattern would overlap, etc. Any of the parametric modelling or other previewing methods described herein can be combined with calculations of the kerf size to form a motion plan that will cut pieces that will fit according to the specified pattern. Also, for motion plans executed across multiple pieces of material 140, changes to one pattern can propagate to the other materials 140, with the corresponding checks executed by the computer program generating the motion plans to see that slots/tabs are within range and do not cause conflict with any other parts of the motion plans.

Derivative Analysis

Derivative analysis of the motion plan can be used to calculate higher derivatives (of arbitrary degree, for example velocity, acceleration, and jerk) of the motion plan. The derivative analysis can be used to determine that operational thresholds are never exceeded. The derivative analysis can be performed remotely, such as on a cloud-based server. Further, the allowable parameters can be modified based on closed-loop feedback. For example, if the head constantly overshoots by a small amount, this can indicate a weak motor that is unable to provide the acceleration required by the motion plan. This condition, possibly unique to the CNC machine 100, can be corrected for by updating the acceleration parameters in the motion plan. In another example, the user may indicate that the machine is shaking, possibly because it is sitting on a flimsy table. Parameters may be adjusted to create less vibration.

Compensation for Systematic Error

By analyzing images taken with the cameras, sources of systematic error, which can be unique to each CNC machine 100 and also change over time, can be determined and corrected for. For example, if a part is created according to the motion plan but has a misalignment in one direction, the misalignment can be detected and stored either on the CNC machine 100 or on a server. Future motion plans can reference the stored file and compensate for the misalignment by creating motion plans that offset the error, creating a new motion plan or by applying a local correction to any received commands. This technique can be applied to, for example, alignments, backlash/hysteresis, offsets, rotations, skews, etc.

Figure 14:
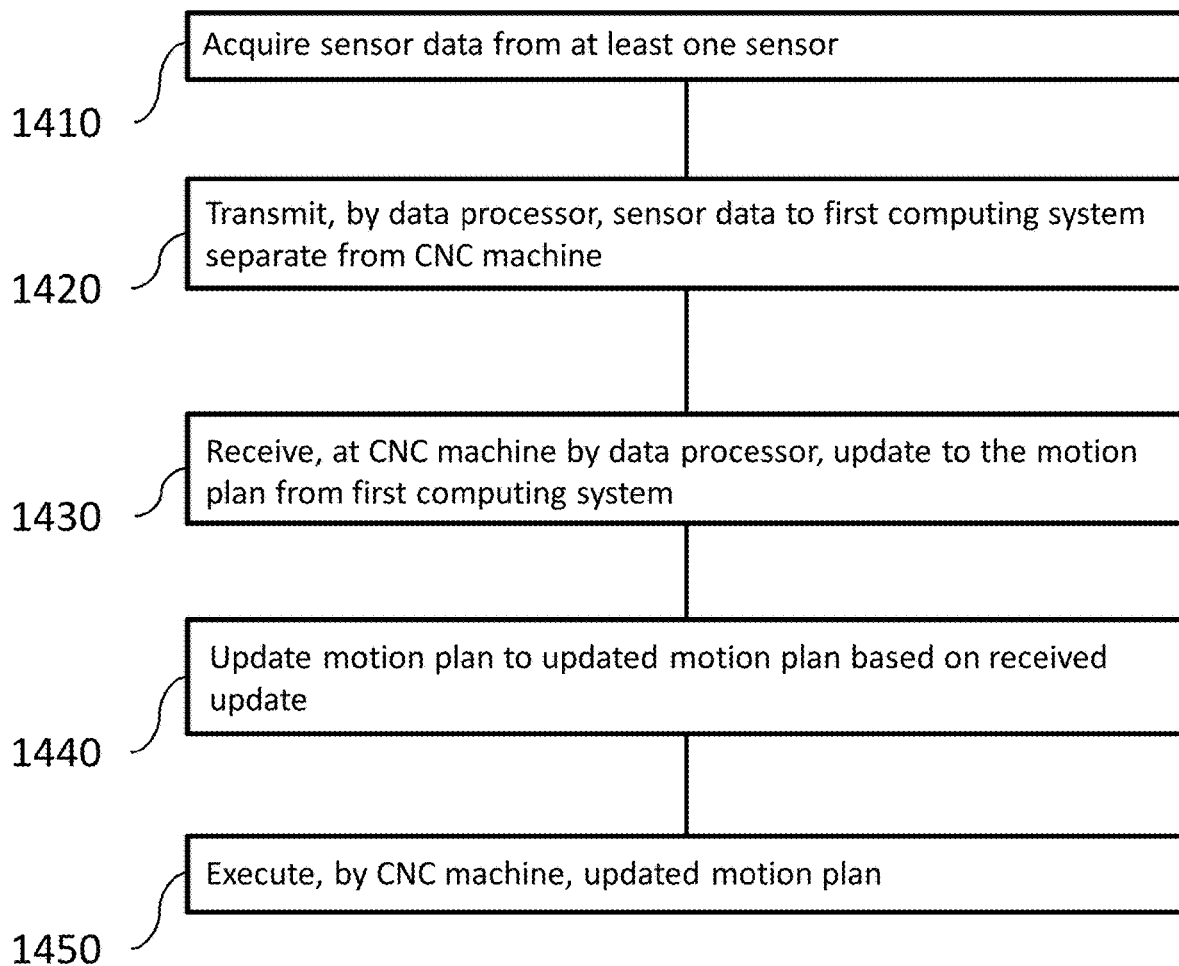
FIG. 14 is a process flow chart a method for updating a motion plan based on sensor data, consistent with implementations of the current subject matter.

FIG. 14 is a process flow chart illustrating features of a method consistent with implementations of the current subject matter.

At 1410, sensor data can be acquired from at least one sensor.

At 1420, sensor data can be transmitted to a first computing system separate from the CNC machine 100. At 1430, the CNC machine 100 can receive an update to the motion plan from the first computing system. At 1440, the motion plan can be updated based on the received update. At 1450, the updated motion plan can be executed by the CNC machine 100.

Figure 15:
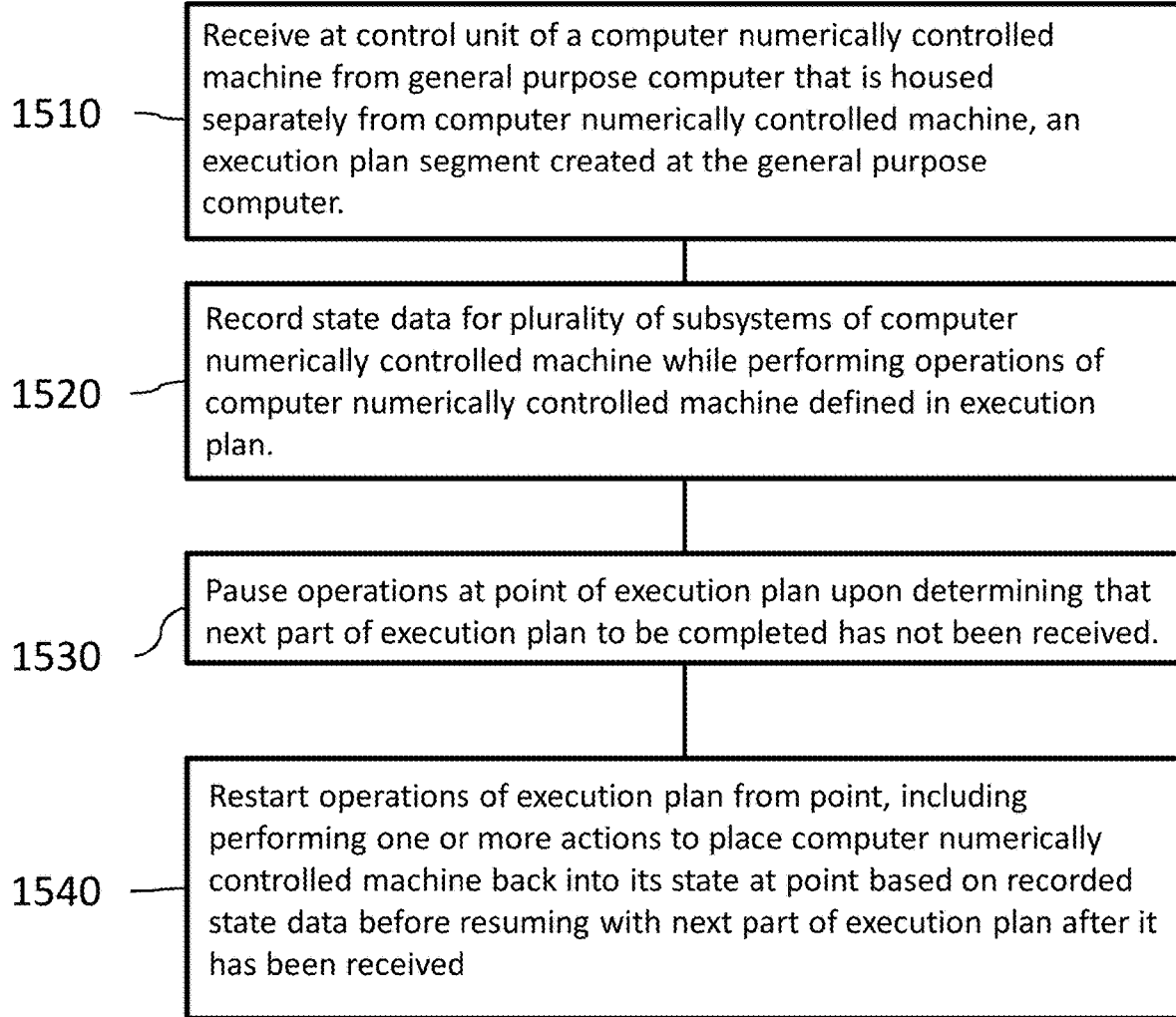
FIG. 15 is a process flow chart illustrating features of a method consistent with implementations of the current subject matter.

FIG. 15 is a process flow chart illustrating features of a method consistent with implementations of the current subject matter. At 1510, a control unit of a computer numerically controlled machine receives, from a general purpose computer, a part of an execution plan created at the general purpose computer, which is housed separately from the computer numerically controlled machine. The execution plan defines operations for causing movement of a moveable head of the computer numerically controlled machine to deliver electromagnetic energy to effect a change in a material within an interior space of the computer numerically controlled machine. At 1520, state data for a plurality of subsystems of the computer numerically controlled machine are recorded while performing operations of the computer numerically controlled machine defined in the execution plan, and at 1530, the operations are paused at a point of the execution plan upon determining that a next part of the execution plan to be completed has not been received. The operations of the execution plan are restarted from the point at 1540. The restarting includes performing one or more actions to place the computer numerically controlled machine back into its state at the point based on the recorded state data before resuming with the next part of the execution plan after it has been received.

FIG. 16 is a process flow chart illustrating features of a method consistent with implementations of the current subject matter. At 1610, an execution plan segment of an execution plan created at the general purpose computer can be received at a control unit of a computer numerically controlled machine. The execution plan can be from a general purpose computer that is housed separately from a computer numerically controlled machine. The execution plan segment can define operations for causing movement of a moveable head of the computer numerically controlled machine to deliver electromagnetic energy to effect a change in a material within an interior space of the computer numerically controlled machine. The execution plan segment can include a predefined safe pausing point from which the execution plan can be restarted while minimizing a difference in appearance of a finished work-product relative to if a pause and restart are not necessary.

The execution plan can comprise a motion plan defining movement of the moveable head and control commands for operation of one or more other components of the computer numerically controlled machine. The one or more other components can comprise one or more of a laser, a power supply, a fan, a thermal control system, an air filter, a coolant pump, a light source, a camera mounted on the moveable head, a camera, or other components mounted inside the interior space but not on the moveable head.

At 1620, a determination that the execution plan comprises a next execution plan segment to be executed after the execution plan segment can be made. In some variations, a determination can be made that the next execution plan segment is fully received by the control unit of a computer numerically controlled machine.

At 1630, the operations can be paused at the predefined safe pausing point until the next execution plan segment is fully received.

At 1640 operations of the computer numerically controlled machine defined in the execution plan segment can be commenced only after determining that the execution plan segment has been received up to and including the predefined safe pausing point by the computer numerically controlled machine. Where the next execution plan segment is fully received by the control unit of a computer numerically controlled machine, the operations of the execution plan can be restarted from the predefined safe pausing point according to the next execution plan segment after the determining.

In some variations, a forecast of variations in sensor data to be generated by one or more sensors of the computer numerically controlled machine during the operations of the execution plan segment can be received at the control unit of the computer numerically controlled machine. The actual data from the one or more sensors can be compared with the forecast. The comparison can be performed by one or more of the computer numerically controlled machine, a general purpose computer in communication with the computer numerically controlled machine, or the like.

In some variations, the forecast can be based on expected electrical, optical, mechanical, thermal results, or the like, of the operations of the execution plan.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method carried out by a computing system comprising at least one processor, the method comprising:
   receiving, by the computing system, a source file describing a pattern to be fabricated by a computer numerically controlled machine of the computing system;
   determining, by the computing system, that the source file has associated with it a predetermined limit to a number of instances of the pattern that can be fabricated;
   creating, by the computing system, a first motion plan from the source file;
   causing, by the computing system, the computer numerically controlled machine to fabricate a first instance of the pattern based on the first motion plan;
   receiving, by the computing system, a command to fabricate a second instance of the pattern based on a second motion plan;
   determining, by the computing system, that fabricating the second instance of the pattern would result in a count of the number of instances of the pattern being fabricated that would exceed the predetermined limit; and
   after determining that fabricating the second instance of the pattern would result in the count of the number of instances of the pattern being fabricated that would exceed the predetermined limit, refusing to create, by the computing system, the second motion plan from the source file.

2. The method of claim 1, wherein the computer numerically controlled machine is a first computer numerically controlled machine, and wherein receiving, by the computing system, the command to fabricate the second instance of the pattern based on the second motion plan comprises:
   receiving, by the computing system, a command for a second computer numerically controlled machine of the computing system to fabricate the second instance of the pattern based on the second motion plan.

3. The method of claim 1, wherein the first motion plan defines a movement of a moveable head of the computer numerically controlled machine and control commands for operation of one or more other components of the computer numerically controlled machine, and wherein the one or more other components comprise one or more of a laser, a power supply, a fan, a thermal control system, an air filter, a coolant pump, a light source, a camera mounted on the moveable head, and a camera mounted inside an interior space of the computer numerically controlled machine but not on the moveable head.

4. The method of claim 3, wherein the first motion plan further defines a temporal element indicating times or time offsets at which actions of the one or more other components necessary to fabricate the first instance of the pattern should occur.

5. The method of claim 1, wherein causing, by the computing system, the computer numerically controlled machine to fabricate the first instance of the pattern based on the first motion plan increases the count of the number of instances of the pattern being fabricated by 1.

6. A non-transitory computer-readable medium, wherein the non-transitory computer-readable medium is provisioned with program instructions that, when executed by at least one processor cause a computing system to:
   receive a source file describing a pattern to be fabricated by a computer numerically controlled machine of the computing system;
   determine that the source file has associated with it a predetermined limit to a number of instances of the pattern that can be fabricated;
   create a first motion plan from the source file;
   cause the computer numerically controlled machine to fabricate a first instance of the pattern based on the first motion plan;
   receive a command to fabricate a second instance of the pattern based on a second motion plan;
   determine that fabricating the second instance of the pattern would result in a count of the number of instances of the pattern being fabricated that would exceed the predetermined limit; and
   after determining that fabricating the second instance of the pattern would result in the count of the number of instances of the pattern being fabricated that would exceed the predetermined limit, refusing to create the second motion plan from the source file.

7. The non-transitory computer-readable medium of claim 6, wherein the computer numerically controlled machine is a first computer numerically controlled machine, and wherein the program instructions that, when executed by at least one processor, cause the computing system to receive the command to fabricate the second instance of the pattern based on the second motion plan comprise program instructions that, when executed by at least one processor, cause the computing system to receive a command for a second computer numerically controlled machine of the computing system to fabricate the second instance of the pattern based on the second motion plan.

8. The non-transitory computer-readable medium of claim 6, wherein the first motion plan defines a movement of a moveable head of the computer numerically controlled machine and control commands for operation of one or more other components of the computer numerically controlled machine, and wherein the one or more other components comprise one or more of a laser, a power supply, a fan, a thermal control system, an air filter, a coolant pump, a light source, a camera mounted on the moveable head, and a camera mounted inside an interior space of the computer numerically controlled machine but not on the moveable head.

9. The non-transitory computer-readable medium of claim 8, wherein the first motion plan further defines a temporal element indicating times or time offsets at which actions of the one or more other components necessary to fabricate the first instance of the pattern should occur.

10. The non-transitory computer-readable medium of claim 6, wherein the program instructions that, when executed by at least one processor, cause the computing system to cause the computer numerically controlled machine to fabricate the first instance of the pattern based on the first motion plan comprise program instructions that, when executed by at least one processor, cause the computing system to increase the count of the number of instances of the pattern being fabricated by 1.

11. The non-transitory computer-readable medium of claim 6, wherein the non-transitory computer-readable medium is also provisioned with program instructions that, when executed by at least one processor, cause the computing system to select the computer numerically controlled machine from a plurality of computer numerically controlled machines.

12. The non-transitory computer-readable medium of claim 6, wherein the non-transitory computer-readable medium is also provisioned with program instructions that, when executed by at least one processor, cause the computing system to optimize the first motion plan based on one or both of a measured attribute and an observed behavior of the computer numerically controlled machine.

13. A computing system comprising:
at least one processor;
non-transitory computer-readable medium; and
program instructions stored on the non-transitory computer-readable medium that are executable by the at least one processor such that the computing system is configured to:
receive a source file describing a pattern to be fabricated by a computer numerically controlled machine of the computing system;
determine that the source file has associated with it a predetermined limit to a number of instances of the pattern that can be fabricated;
create a first motion plan from the source file;
cause the computer numerically controlled machine to fabricate a first instance of the pattern based on the first motion plan;
receive a command to fabricate a second instance of the pattern based on a second motion plan;
determine that fabricating the second instance of the pattern would result in a count of the number of instances of the pattern being fabricated that would exceed the predetermined limit; and
after determining that fabricating the second instance of the pattern would result in the count of the number of instances of the pattern being fabricated that would exceed the predetermined limit, refuse to create the second motion plan from the source file.

14. The computing system of claim 13, wherein the computer numerically controlled machine is a first computer numerically controlled machine, and wherein the program instructions that are executable by the at least one processor such that the computing system is configured to receive the command to fabricate the second instance of the pattern based on the second motion plan comprise program instructions that are executable by the at least one processor such that the computing system is configured to receive a command for a second computer numerically controlled machine of the computing system to fabricate the second instance of the pattern based on the second motion plan.

15. The computing system of claim 13, wherein the first motion plan defines a movement of a moveable head of the computer numerically controlled machine and control commands for operation of one or more other components of the computer numerically controlled machine, and wherein the one or more other components comprise one or more of a laser, a power supply, a fan, a thermal control system, an air filter, a coolant pump, a light source, a camera mounted on the moveable head, and a camera mounted inside an interior space of the computer numerically controlled machine but not on the moveable head.

16. The computing system of claim 15, wherein the first motion plan further defines a temporal element indicating times or time offsets at which actions of the one or more other components necessary to fabricate the first instance of the pattern should occur.

17. The computing system of claim 13, wherein the program instructions that are executable by the at least one processor such that the computing system is configured to cause the computer numerically controlled machine to fabricate the first instance of the pattern based on the first motion plan comprise program instructions that are executable by the at least one processor such that the computing system is configured to increase the count of the number of instances of the pattern being fabricated by 1.

18. The computing system of claim 13, further comprising program instructions that are executable by the at least one processor such that the computing system is configured to select-the computer numerically controlled machine from a plurality of computer numerically controlled machines.

19. The computing system of claim 13, further comprising program instructions that are executable by the at least one processor such that the computing system is configured to optimize the first motion plan based on one or both of a measured attribute and an observed behavior of the computer numerically controlled machine.

20. The computing system of claim 13, wherein the program instructions that are executable by the at least one processor such that the computing system is configured to receive the source file comprise program instructions that are executable by the at least one processor such that the computing system is configured to receive the source file from a cloud-based server.

* * * * *